(12) United States Patent
Kim et al.

(10) Patent No.: US 11,393,240 B2
(45) Date of Patent: **\*Jul. 19, 2022**

(54) FINGERPRINT MANAGEMENT METHOD FOR DISPLAY DEVICE WITH FINGERPRINT AREA

(71) Applicant: Samsung Display Co. Ltd., Yongin-si (KR)

(72) Inventors: Jeon Kyoo Kim, Seoul (KR); Jun Yong Song, Hwaseong-si (KR); Jae Keun Lim, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/146,923

(22) Filed: Jan. 12, 2021

(65) Prior Publication Data

US 2021/0133416 A1 May 6, 2021

Related U.S. Application Data

(62) Division of application No. 16/387,545, filed on Apr. 18, 2019, now Pat. No. 10,922,516.

(30) Foreign Application Priority Data

Aug. 2, 2018 (KR) .......................... 10-2018-0090506

(51) Int. Cl.
*G06V 40/13* (2022.01)
*G09G 3/3233* (2016.01)
(Continued)

(52) U.S. Cl.
CPC ........ *G06V 40/1306* (2022.01); *G06F 3/0412* (2013.01); *G06F 3/0445* (2019.05);
(Continued)

(58) Field of Classification Search
CPC ... G06K 9/0002; G06F 3/0446; G06F 3/0445; G06F 3/0412; G06F 21/32; G09G 3/3233;
(Continued)

(56) References Cited

U.S. PATENT DOCUMENTS

| 8,994,619 B2 | 3/2015 | Jeong |
| 10,922,516 B2 * | 2/2021 | Kim .................... G06F 21/32 |

(Continued)

FOREIGN PATENT DOCUMENTS

| CN | 106095159 | 11/2016 |
| EP | 2463849 | 6/2012 |

(Continued)

OTHER PUBLICATIONS

Partial European Search Report issued in European Patent Application No. 19181705.5. (dated Sep. 17, 2019).

(Continued)

*Primary Examiner* — Liliana Cerullo
(74) *Attorney, Agent, or Firm* — H.C. Park & Associates, PLC

(57) ABSTRACT

A display device has a display area with a first area in which a fingerprint is recognized and a second area in which a fingerprint is not recognized, and a non-display area. A fingerprint sensing unit is disposed to overlap with the first area. A first pixel set is disposed to overlap with the first area, and a second pixel set is disposed to overlap with the second area, each set including a plurality of pixels. A first voltage signal is provided to the first pixel set as a variable frequency signal, and includes a first period during which the first voltage signal is a first frequency signal, a second period during which the first voltage signal is a second frequency signal having a lower frequency than the first frequency signal, and a third period during which the first voltage signal is the first frequency signal.

8 Claims, 23 Drawing Sheets

(51) Int. Cl.
 *G06F 3/044* (2006.01)
 *G06F 21/32* (2013.01)
 *G06F 3/041* (2006.01)

(52) U.S. Cl.
 CPC ............ *G06F 3/0446* (2019.05); *G06F 21/32* (2013.01); *G09G 3/3233* (2013.01); *G09G 2300/0426* (2013.01); *G09G 2300/0809* (2013.01)

(58) Field of Classification Search
 CPC ... G09G 2300/0426; G09G 2300/0809; G09G 2300/0819; G09G 2300/0842; G09G 2300/0861; G09G 2330/06
 See application file for complete search history.

(56) References Cited

U.S. PATENT DOCUMENTS

| | | | |
|---|---|---|---|
| 2001/0011979 | A1 | 8/2001 | Hasegawa et al. |
| 2009/0146987 | A1 | 6/2009 | Kim et al. |
| 2017/0024602 | A1 | 1/2017 | Han |
| 2017/0025068 | A1* | 1/2017 | Jeoung ................. G09G 3/3677 |
| 2017/0090673 | A1 | 3/2017 | Kim et al. |
| 2017/0220838 | A1 | 8/2017 | He et al. |
| 2017/0316250 | A1 | 11/2017 | Roh et al. |
| 2017/0364763 | A1 | 12/2017 | Jin et al. |
| 2020/0005706 | A1* | 1/2020 | Li ........................ G06K 9/0004 |

FOREIGN PATENT DOCUMENTS

| | | |
|---|---|---|
| KR | 10-2017-0122386 | 11/2017 |
| KR | 10-2017-0141522 | 12/2017 |
| KR | 10-2018-0005588 | 1/2018 |

OTHER PUBLICATIONS

Non-Final Office Action issued in U.S. Appl. No. 16/387,545 dated Apr. 14, 2020.
Final Office Action issued in U.S. Appl. No. 16/387,545 dated Jul. 28, 2020.
Notice of Allowance issued in U.S. Appl. No. 16/387,545 dated Oct. 14, 2020.

* cited by examiner

FIG. 1
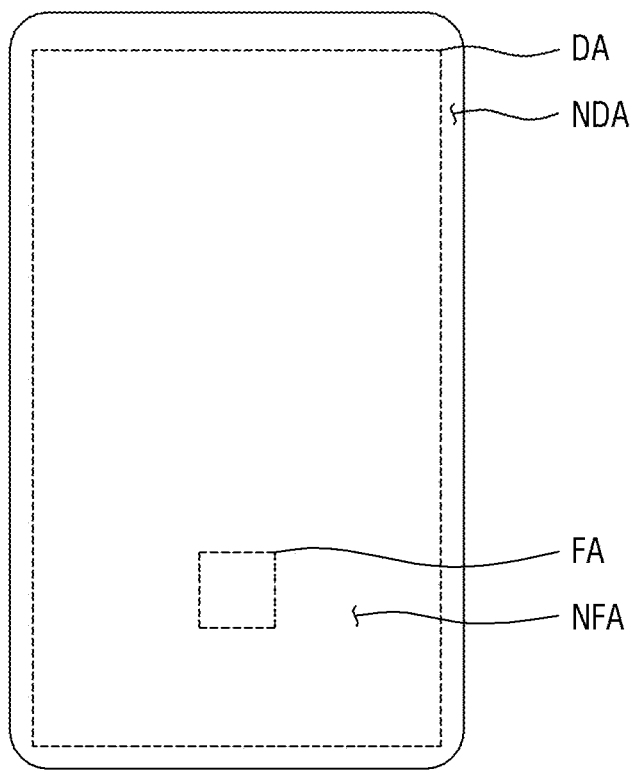
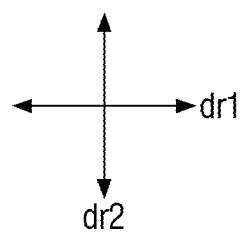

FIG. 5
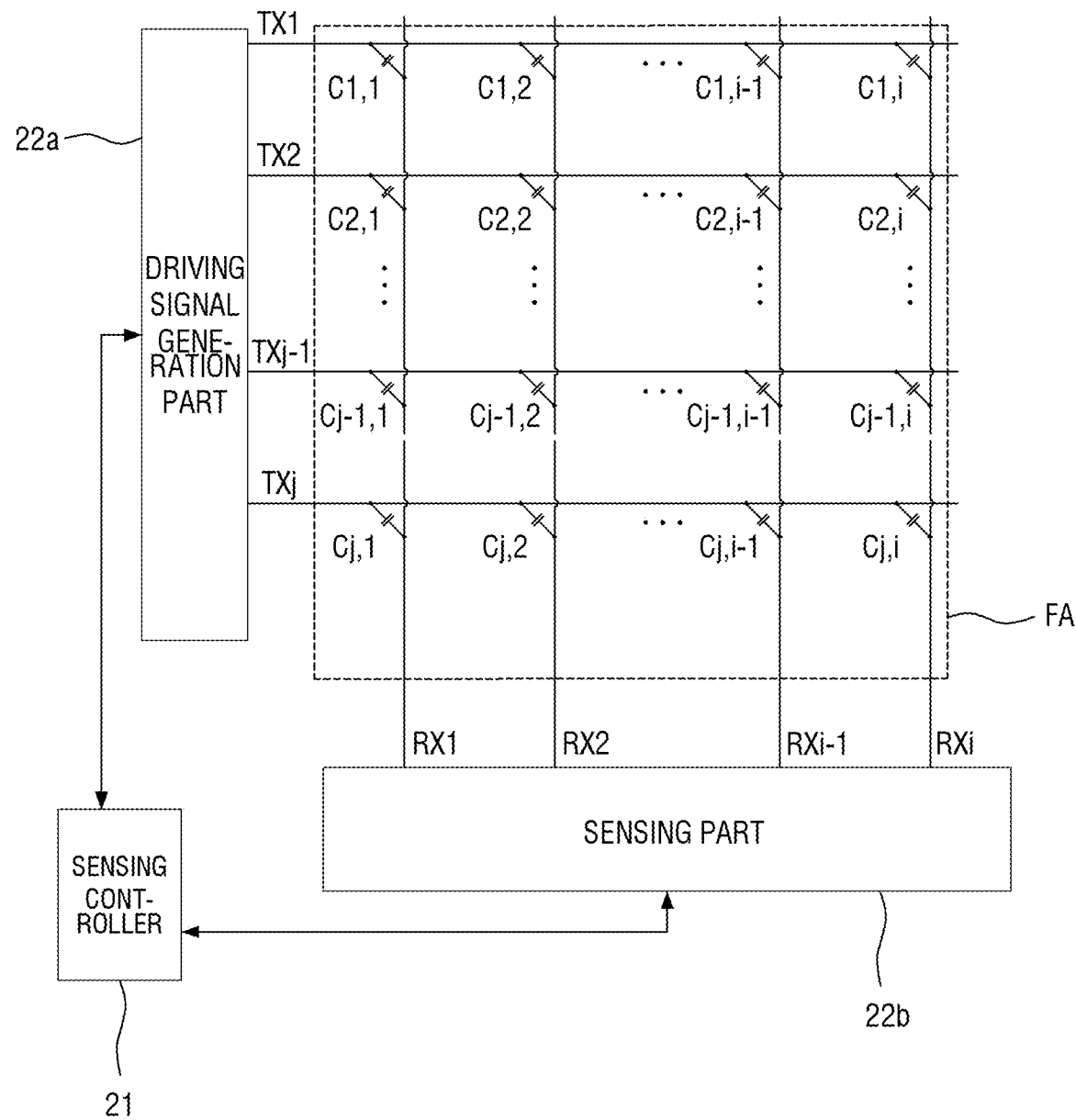
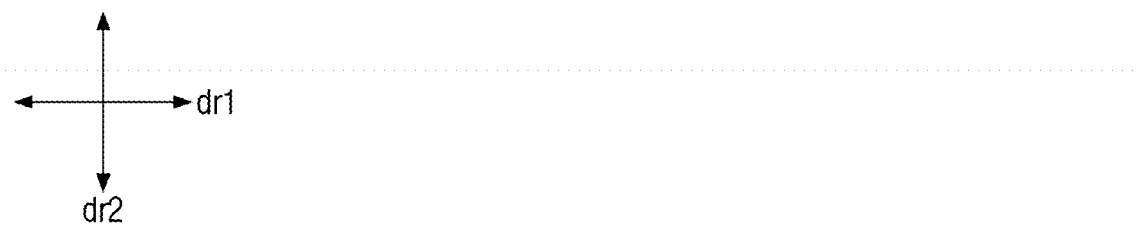

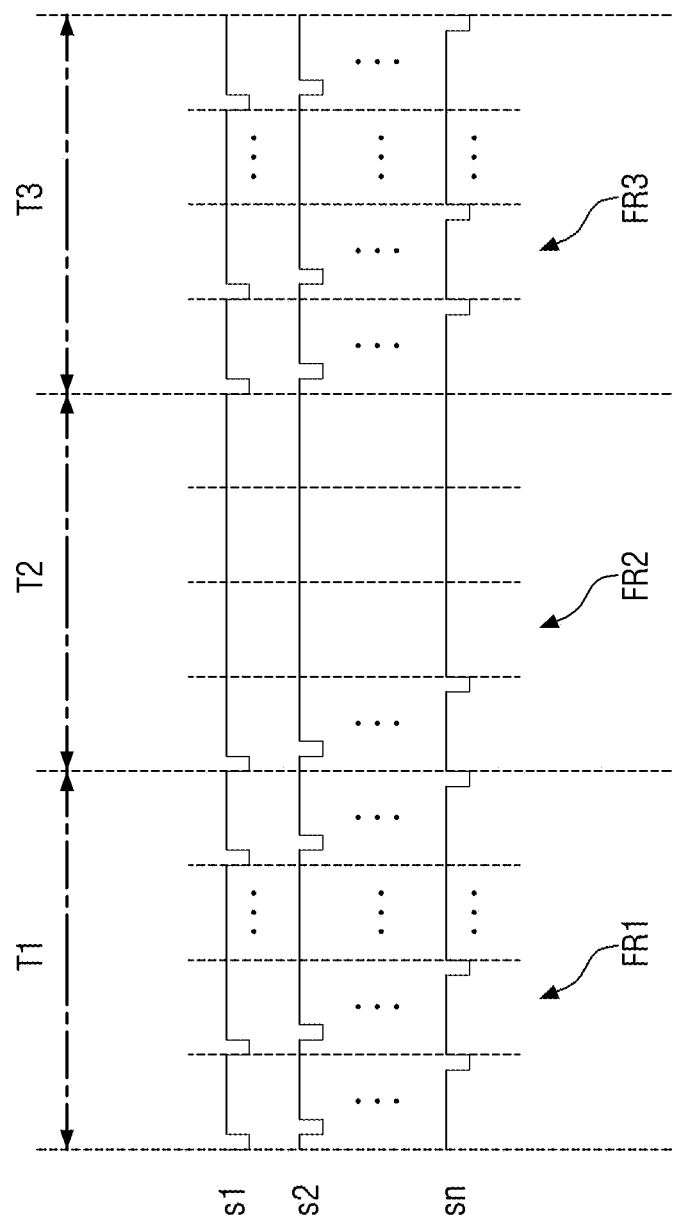

FINGERPRINT MANAGEMENT METHOD FOR DISPLAY DEVICE WITH FINGERPRINT AREA

CROSS-REFERENCE TO RELATED APPLICATION

This application is a Divisional of U.S. patent application Ser. No. 16/387,545, filed Apr. 18, 2019, which claims priority from and the benefit of Korean Patent Application No. 10-2018-0090506, filed on Aug. 2, 2018, each of which is hereby incorporated by reference for all purposes as if fully set forth herein.

BACKGROUND

Field

Exemplary embodiments/implementations of the invention relate generally to a display device, and more specifically, to a display device capable of sensing fingerprint input.

Discussion of Background

A fingerprint sensor or a fingerprint recognition sensor is a sensor that detects a fingerprint of a user. Recently, smartphones or wearable devices equipped with fingerprint sensors have been widely used, and these fingerprint sensors can detect fingerprints using an electrical measurement method or an optical measurement method.

An optical fingerprint sensor using the optical measurement method can acquire a fingerprint image by detecting light reflected from the ridges and the valleys of a fingerprint with the use of an image sensor. To apply a fingerprint sensor to a smartphone or a wearable device, the size of the fingerprint sensor needs to be reduced, and the fingerprint recognition performance of the fingerprint sensor needs to be improved.

The above information disclosed in this Background section is only for understanding of the background of the inventive concepts, and, therefore, it may contain information that does not constitute prior art.

SUMMARY

Devices constructed/methods according to exemplary embodiments of the invention are capable of providing a display device and a fingerprint management method capable of improving signal-to-noise ratio (SNR) in connection with fingerprint sensing.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

Additional features of the inventive concepts will be set forth in the description which follows, and in part will be apparent from the description, or may be learned by practice of the inventive concepts.

According to one or more implementations of the invention, a display device having a display area including a first area in which a fingerprint is recognized and a second area in which a fingerprint is not recognized, and a non-display area disposed on the outside of the display area, the display device including: a fingerprint sensing unit disposed to overlap with the first area; a plurality of pixels including: a first pixel set disposed to overlap with the first area; and a second pixel set disposed to overlap with the second area, wherein the display device is configured to provide a first voltage signal to the first pixel set, the first voltage signal being a variable frequency signal including: a first period during which the first voltage signal is a first frequency signal; a second period during which the first voltage signal is a second frequency signal having a lower frequency than the first frequency signal; and a third period during which the first voltage signal is the first frequency signal.

The first frequency signal may have a frequency of 60 Hz or greater and 120 Hz or less, and wherein the second frequency signal may have a frequency of 0.1 Hz or greater and 20 Hz or less.

During the second period, a frequency signal having a frequency of substantially 0 Hz may be provided to the first pixel set.

The display device may be configured to provide a second voltage signal as a scan signal to the second pixel set, the second voltage signal being a variable frequency signal including: the first frequency signal during the first period, the second frequency signal during the second period, and the first frequency signal during the third period.

Each of the plurality of pixels may include: a light-emitting element; a first transistor configured to transmit a driving current to the light-emitting element; a second transistor configured to transmit a data signal to the first transistor; a third transistor configured to transmit a threshold voltage-compensated data signal to a gate electrode of the first transistor; and a fourth transistor configured to transmit an initialization voltage signal to the gate electrode of the first transistor.

The first and second transistors may be P-type metal-oxide-semiconductor (PMOS) transistors, and wherein the third and fourth transistors may be N-type metal-oxide-semiconductor (NMOS) transistors.

The display device may further include a display driver integrated circuit configured to control the plurality of pixels, and wherein the display driver integrated circuit may include a fingerprint sensing processor configured to control the fingerprint sensing unit.

The display device may further include: a display driver integrated circuit configured to control the plurality of pixels; and an application processor configured to control the display driver integrated circuit, and wherein the application processor may include a fingerprint sensing processor configured to control the fingerprint sensing unit.

The display device may further include a base substrate on which the plurality of pixels is disposed, and wherein the fingerprint sensing unit may be disposed on a surface of the base substrate.

The fingerprint sensing unit may include: a pin hole mask disposed on the surface of the base substrate; and an image sensor disposed on the pin hole mask.

The fingerprint sensing unit may also include: a plurality of first fingerprint sensing electrodes extending in a first direction; and a plurality of second fingerprint sensing electrodes extending in a second direction intersecting the first direction, the plurality of second fingerprint sensing electrodes disposed to be electrically insulated from the first fingerprint sensing electrodes.

The display device may further include an input sensing layer including the fingerprint sensing unit, the input sensing layer including: a plurality of first touch sensing electrodes extending in the first direction; and a plurality of second touch sensing electrodes extending in the second direction, wherein the first fingerprint sensing electrodes may be disposed between the first touch sensing electrodes, and wherein the second fingerprint sensing electrodes may be disposed between the second touch sensing electrodes.

In the first area, the first fingerprint sensing electrodes may intersect the second fingerprint sensing electrodes.

According to one or more implementations of the invention, a fingerprint management method of a display device including a first area in which a fingerprint is recognized and a second area in which a fingerprint is not recognized, the fingerprint management method including: first set of steps during which fingerprint recognition is not performed; and second set of steps during which the fingerprint recognition is performed, wherein the display device includes a plurality of pixels including a first pixel set disposed to overlap with the first area, and a second pixel set disposed to overlap with the second area and includes a plurality of pixels, and wherein the method includes providing a first voltage signal the first pixel set, the first voltage signal being a variable frequency signal including: a first frequency signal in the first set of steps; and a second frequency signal having a lower frequency than the first frequency signal, in the second set of steps.

The first set of steps may include detecting a request for fingerprint authentication, and wherein the second set of steps may include: determining a presence of a fingerprint touch input; and collecting and processing fingerprint information.

The first frequency signal may have a frequency of 60 Hz or greater and 120 Hz or less, and wherein the second frequency signal may have a frequency of 0.1 Hz or greater and 20 Hz or less.

In the first set of steps, a frequency signal having a frequency of substantially 0 Hz may be provided to the first pixel set.

In the first set of steps, the first frequency signal may be provided to the first and second pixel sets to emit light, and wherein in the second set of steps, the first frequency signal may be provided to the first pixel set to emit light and the second frequency signal may be provided to the second pixel set to emit light.

In the second set of steps, the second pixel set may not emit light.

The display device may have a display area, and a non-display area disposed on the outside of the display area, and wherein the display area may include the first area and the second area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 1 is a plan view of an organic light-emitting diode (OLED) display device according to an exemplary embodiment of the present disclosure;

FIG. 5 is a block diagram illustrating how the OLED display device of FIG. 1 controls a fingerprint sensing unit;

FIG. 11 is a timing diagram illustrating scan signals provided to pixels overlapping with a fingerprint authentication area during fingerprint management;

DETAILED DESCRIPTION

Figure 2:
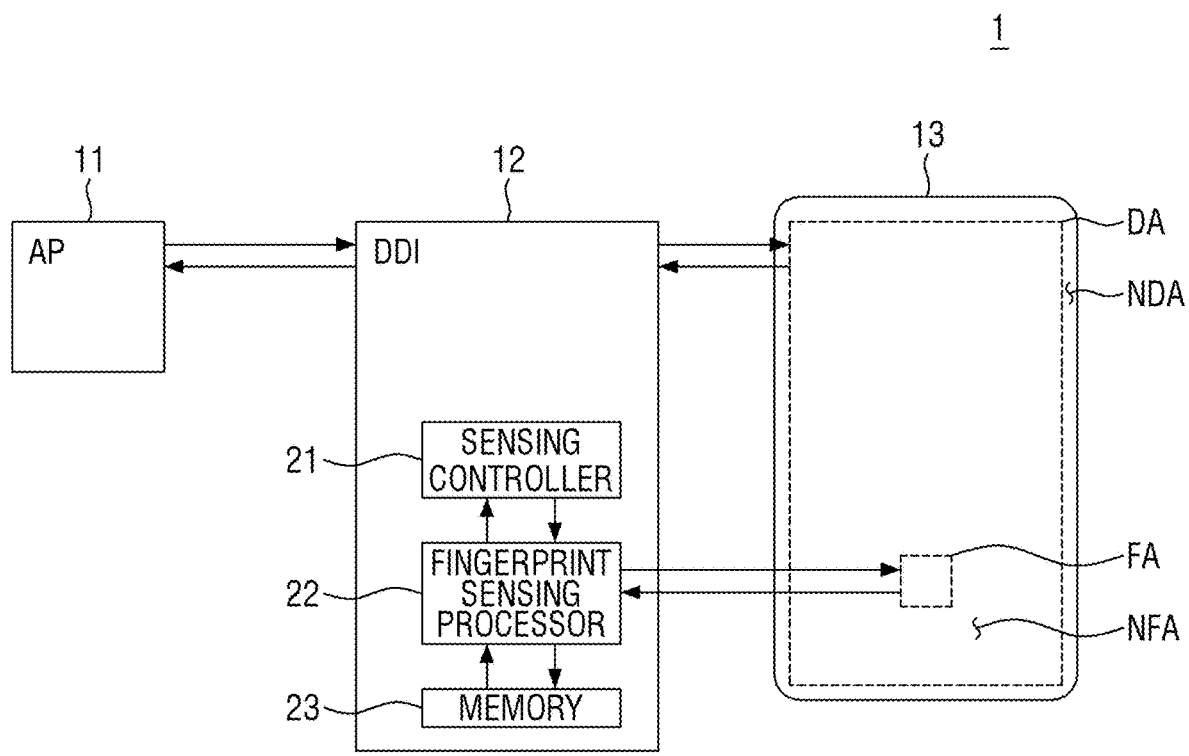
FIG. 2 is a block diagram of the OLED display device of FIG. 1.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the dr1-axis and the dr2-axis are not limited to two of three axes of a rectangular coordinate system, such as the x, y, and z-axes, and may be interpreted in a broader sense. For example, a D1-axis, a D2-axis, and a D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Display devices according to various exemplary embodiments of the present disclosure, which are devices for displaying moving or still images or devices for displaying stereoscopic images, may be used not only as the displays of mobile electronic devices such as a mobile terminal, a smartphone, a tablet personal computer (PC), a smart watch, and a navigation device, but also as the displays of various other products such as a television (TV), a notebook computer, a monitor, a billboard, or an Internet of Things (IoT) device.

Exemplary embodiments of the present disclosure will hereinafter be described with reference to the accompanying drawings, taking an organic light-emitting diode (OLED) display device as an example, but the present disclosure is also applicable to various other display devices such as a liquid crystal display device, a field emission display device, or an electrophoretic display device. In the drawings, like reference numerals indicate like elements.

FIG. 1 is a plan view of an OLED display device according to an exemplary embodiment of the present disclosure.

Referring to FIG. 1, an OLED display device 1 includes a display area DA and a non-display area NDA.

The display area DA is defined as an area in which an image is displayed. The display area DA may be used as a detection member for detecting an external environment. That is, the display area DA may be used to display an image or to recognize a fingerprint of a user or touch input. In one exemplary embodiment, the display area DA may have a flat shape, but the exemplary embodiments are not limited thereto. In another exemplary embodiment, at least part of the display area DA may be bent or curved.

In one exemplary embodiment, the display area DA may have a rectangular shape. For example, the display rea DA may have a rectangular shape with short sides extending in a first direction dr1 and long sides extending in a second direction dr2, which intersects the first direction dr1, but the exemplary embodiments are not limited thereto. That is, the display area DA may have various other shapes such as a polygonal shape, a circular shape, or an irregular shape. For convenience, a horizontal direction is defined as the first direction dr1, and a direction that intersects the first direction dr1 is defined as the second direction dr2. That is, the second direction dr2 may correspond to a vertical direction. However, the present disclosure is not limited to this, and the first and second directions dr1 and dr2 should be interpreted as being relative directions intersecting each other.

A fingerprint sensing area FA may be disposed in at least part of the display area DA. The fingerprint sensing area FA may have a predetermined size (e.g., a statistical and technical size capable of recognizing a fingerprint of the user) within the display area DA. In one exemplary embodiment, the fingerprint sensing area FA may be disposed on one side of the display area DA with respect to the center of the display area DA and may have a square shape. However, the shape and the location of the fingerprint sensing area FA are not particularly limited, but may vary. A fingerprint sensing unit, which senses a fingerprint of the user, may be disposed in a space that substantially overlaps with the fingerprint sensing area FA in the vertical direction. The expression "two elements overlap with each other," as used herein, means that the two elements overlap with each other in the thickness direction of the OLED display device 1 (or a direction perpendicular to the surface of a base substrate 200 of FIG. 2). The fingerprint sensing unit will be described later in detail.

A non-fingerprint sensing area NFA may also be disposed in the display area DA. The non-fingerprint sensing area NFA may be a part of the display area DA that is not the fingerprint sensing area FA. In the non-fingerprint sensing area NFA, a plurality of pixels may be disposed. The non-fingerprint sensing area NFA may be an area where fingerprints cannot be recognized or fingerprint information cannot be collected.

The non-display area NDA is disposed on the outside of the display area DA and is defined as an area where no images are displayed. In one exemplary embodiment, the non-display area NDA may be disposed on the outside of the display area DA to surround the display area DA, but the exemplary embodiments are not limited thereto. That is, the shapes of the display area DA and the non-display area NDA are not particularly limited. In one exemplary embodiment, the non-display area NDA may have a flat shape, but the exemplary embodiments are not limited thereto. That is, the non-display area NDA may be at least partially bent or curved.

A speaker module, a microphone module, a camera module, a sensor module, and the like may be disposed in the non-display area NDA. Here, the sensor module may include at least one of an illumination sensor, a proximity sensor, an infrared sensor, and an ultrasonic sensor.

FIG. 2 is a block diagram of the OLED display device of FIG. 1.

Referring to FIG. 2, the OLED display device 1 may include an application processor 11, a display driver integrated circuit (DDI) 12, and a display panel 13, but the exemplary embodiments are not limited thereto. The application processor 11 may be optional and may be connected, as an external device, to the OLED display device 1.

The application processor 11 may control the DDI 12. The application processor 11 may provide image data and control signals and a clock signal for the image data to the DDI 12.

In one exemplary embodiment, the DDI 12 may include a controller, a fingerprint sensing processor 22, and a memory 23. The controller may include a pixel controller 31 (of FIG. 3), which processes image data RGB in accordance with a control signal and outputs display data DDTA to the display panel 13, and a sensing controller 21, which outputs a driving signal for fingerprint sensing in accordance with a control signal, receives a sensing signal in accordance with fingerprint sensing, and compares the sensing signal with input data from the memory 23. The sensing controller 21 may control the fingerprint sensing processor 22 to provide the driving signal to the fingerprint sensing unit and to receive the sensing signal from the fingerprint sensing unit. The memory 23 may store one or more user fingerprint data. Fingerprint data obtained by the sensing signal provided to the fingerprint sensing processor 22 may be compared with the one or more user fingerprint data stored in the memory 23. The pixel controller 31 and the sensing controller 21 are illustrated as being separate from each other, but the exemplary embodiments are not limited thereto. Alternatively, a single controller may be provided to control both the display panel 13 and the fingerprint sensing unit.

In other words, the DDI 12 may be configured to include not only the pixel controller 31, which controls the output of the display panel 13, but also the sensing controller 21, and may thus be able to process and compare fingerprint data. The DDI 12 may allow the pixel controller 31 and the sensing controller 21 to share internal circuitry such as a reference voltage. By including the sensing controller 21 in the DDI 12, rather than providing the sensing controller 21 as a separate element from the DDI 12, a DDI 12 equipped with fingerprint authentication technology can be realized, and the manufacturing cost of the OLED display device 1 can be reduced.

The pixel controller 31 may control pixels included in the display area DA. This will be hereinafter be described.

Figure 3:
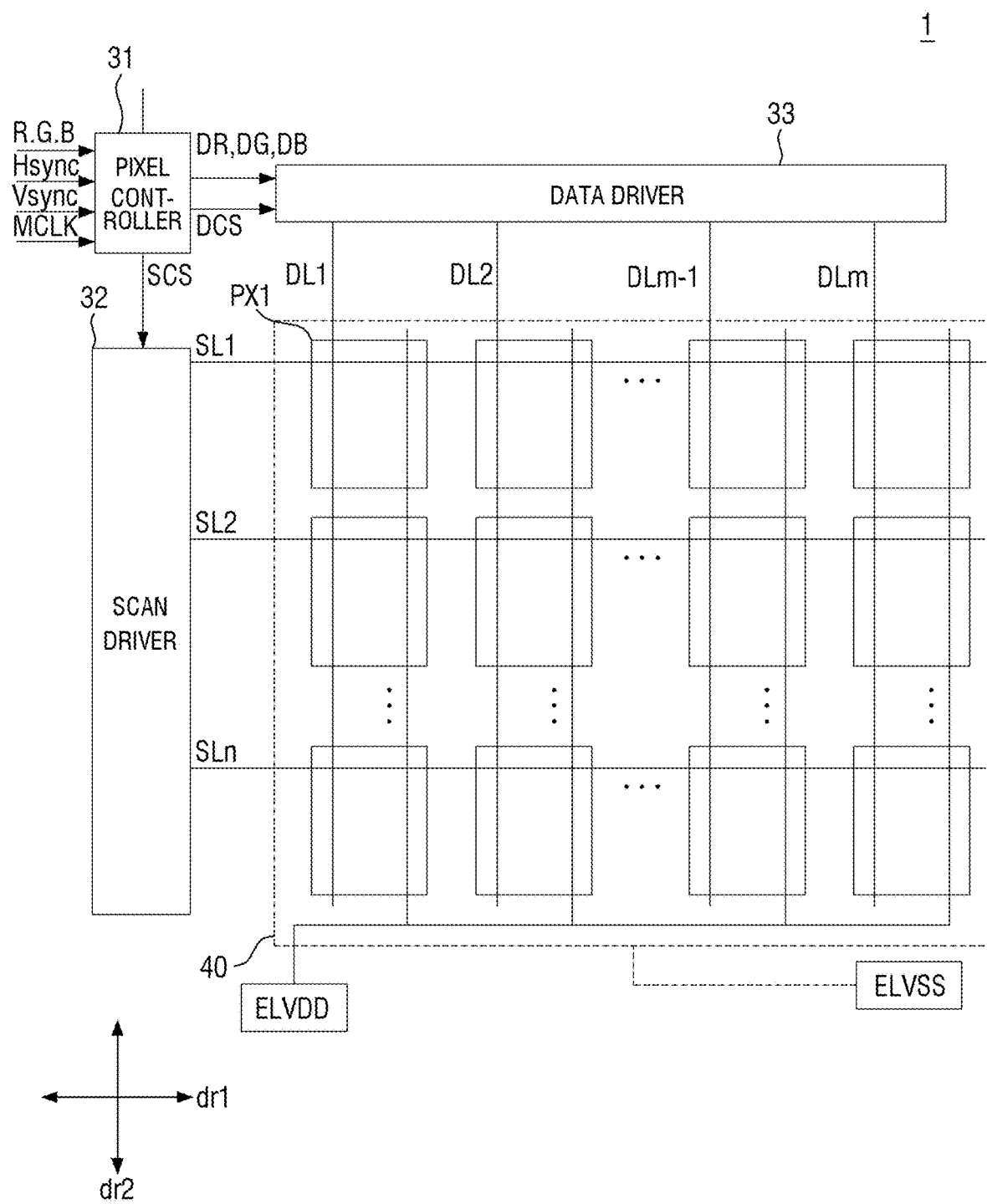
FIG. 3 is a block diagram illustrating how the OLED display device of FIG. 1 controls a display panel.
Figure 4:
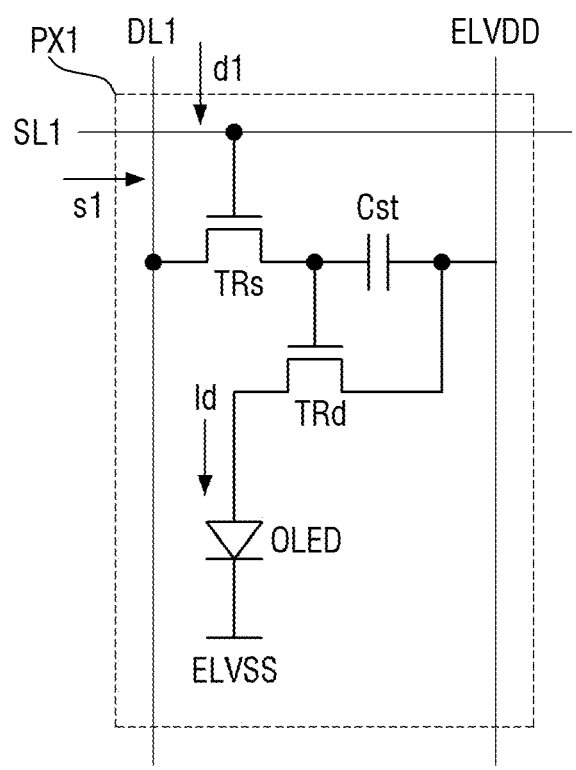
FIG. 4 is an equivalent circuit diagram of a pixel of the OLED display device of FIG. 1.

FIG. 3 is a block diagram illustrating how the OLED display device 1 of FIG. 1 controls the display panel 13. FIG. 4 is an equivalent circuit diagram of a pixel of the OLED display device 1 of FIG. 1.

Referring to FIG. 3, the OLED display device 1 includes a display 40, which includes a plurality of pixels, a scan driver 32, a data driver 33, and the pixel controller 31.

The display 40 may include a plurality of pixels disposed at the intersections between a plurality of first through n-th scan lines SL1 through SLn and a plurality of first through m-th data lines DL1 through DLm and arranged in a matrix form.

The first through n-th scan lines SL1 through SLn may extend in the first direction dr1 (or the horizontal direction), and the first through m-th data lines DL1 through DLm may extend in the second direction dr2 (or the vertical direction). The first and second directions dr1 and dr2 may be mutually switched. A first power supply voltage supply line for supplying a first power supply voltage ELVDD may branch off into columns and may extend in the second direction dr2, but the exemplary embodiments are not limited thereto. That is, the direction in which the first power supply voltage supply line extends may vary.

One scan line (i.e., the first scan line SL1), one data line (i.e., the first data line DL1), and one first power supply voltage supply line may be configured to pass through a pixel PX1, which is an exemplary pixel in a first row and a first column, but the types and the number of lines that pass through each pixel are not particularly limited. That is, more than one scan line (e.g., three scan lines) and another wire such as an emission control line may further pass through each pixel.

The scan driver 32 transmits scan signals to the pixels via the first through n-th scan lines SL1 through SLn. In one exemplary embodiment, the scan driver 32 sequentially applies scan signals. For example, the scan driver 32 may sequentially apply first through n-th scan signals to first through n-th pixel rows.

The data driver 33 transmits data signals to the pixels via the first through m-th data lines DL1 through DLm. The data signals may be applied to selected pixels whenever scan signals are applied to each of the first through n-th scan lines SL1 through SLn.

The pixel controller 31 converts a plurality of image signals (R, G, and B) provided by the application processor 11 into a plurality of image data signals (DR, DG, and DB) and transmits the image data signals (DR, DG, and DB). The pixel controller 31 receives a vertical synchronization signal Vsync, a horizontal synchronization signal Hsync, and a clock signal MCLK, generates control signals for controlling the scan driver 32 and the data driver 33, and transmits the generated control signals to the scan driver 32 and the data driver 33. That is, the pixel controller 31 generates a scan driving control signal SCS for controlling the scan driver 32 and a data driving control signal DCS for controlling the data driver 33 and transmits the scan driving control signal SCS and the data driving control signal DCS to the scan driver 32 and the data driver 33, respectively.

Referring to FIG. 4, the pixel PX1 receives the first power supply voltage ELVDD and a second power supply voltage ELVSS. The first power supply voltage ELVDD may be a high-level voltage, and the second power supply voltage ELVSS may be a low-level voltage lower than the first power supply voltage ELVDD.

In response to a data signal dl being transmitted via the first data line DL1, the pixel PX1 emits light of a predetermined luminance using a driving current applied to a light-emitting element.

The first and second power supply voltages ELVDD and ELVSS may be supplied by an external voltage source.

The pixel PX1 of the OLED display device 1 may include an OLED "OLED", a plurality of transistors (TRs and TRd), and a storage capacitor Cst. In one exemplary embodiment, the data signal dl is applied to the pixel PX1 via the first data line DL1, which extends in the second direction dr2, a scan signal s1 is applied to the pixel PX1 via the first scan line SL1, the first power supply voltage ELVDD is applied to the pixel PX1 via a first power supply voltage supply line, and the second power supply voltage ELVSS is applied to the pixel PX1 via a second power supply voltage supply line.

The OLED "OLED" includes first and second pixel electrodes. Here, the first pixel electrode may be the anode of the OLED "OLED", and the second pixel electrode may be the cathode of the OLED "OLED". The storage capacitor Cst includes a first capacitor electrode (CE1a or CE1b of FIG. 14) and a second capacitor electrode (CE2a or CE2b of FIG. 14).

In one exemplary embodiment, the transistors (TRs and TRd) may include a first transistor TRs and a second transistor TRd. The first transistor TRs may be a switching transistor, and the second transistor TRd may be a driving transistor. However, the number of transistors that can be included in the pixel PX1 is not particularly limited, but may vary. In other exemplary embodiments, the pixel PX1 may include three transistors or seven transistors.

The transistors (TRs and TRd) may be thin-film transistors (TFTs). Each of the transistors (TRs and TRd) includes a gate electrode, a first electrode, and a second electrode. One of the first and second electrodes is a source electrode, and the other electrode is a drain electrode.

The gate electrode of the first transistor TRs is connected to the first scan line SL1. The first electrode of the first transistor TRs is connected to the first data line DL1. The second electrode of the first transistor TRs may be connected to the first capacitor electrode of the storage capacitor Cst and the gate electrode of the second transistor TRd. The first transistor TRs may be turned on by the scan signal s1 and may perform a switching operation to transmit the data signal dl to the gate electrode of the second transistor TRd. The first transistor TRs may transmit the data signal dl to the second electrode of the second transistor TRd via the storage capacitor Cst. The second electrode of the first transistor TRs and the second transistor of the second transistor TRd may not be in physical contact with each other.

The gate electrode of the second transistor TRd may be connected to the first capacitor electrode of the storage capacitor Cst and the second electrode of the first transistor TRs. The first electrode of the second transistor TRd may be connected to the anode of the OLED "OLED". The second electrode of the second transistor TRd may be connected to the first power supply voltage supply line and the second capacitor electrode of the storage capacitor Cst. The second transistor TRd receives the data signal dl in accordance with the switching operation of the first transistor TRs and supplies a driving current Id to the OLED "OLED".

The relationship between the sensing controller 21 and the fingerprint sensing unit will hereinafter be described.

FIG. 5 is a block diagram illustrating how the OLED display device 1 of FIG. 1 controls the fingerprint sensing unit.

The OLED display device 1 may include a plurality of first fingerprint sensing electrodes TEb (referring to FIG. 13), which extend in the first direction dr1, and a plurality of second fingerprint sensing electrodes REb (referring to FIG. 13), which extend in the second direction dr2. The first fingerprint sensing electrodes TEb and the second fingerprint sensing electrodes REb may form the fingerprint sensing unit. The first fingerprint sensing electrodes TEb and the second fingerprint sensing electrodes REb may acquire fingerprint information in a self-capacitance manner and/or a mutual capacitance manner. In the description that follows, it is assumed that the OLED display device 1 includes a plurality of first fingerprint sensing electrodes TEb and a plurality of second fingerprint sensing electrodes REb and acquires fingerprint information in a mutual capacitance manner. However, the exemplary embodiments are not limited thereto. In other exemplary embodiments, the OLED display device 1 may acquire fingerprint information in a self-capacitance manner or in an optical sensing manner.

The first fingerprint sensing electrodes TEb and the second fingerprint sensing electrodes Reb may be driving electrodes and sensing electrodes, respectively, or vice versa. In the description that follows, it is assumed that the first fingerprint sensing electrodes TEb are driving electrodes and the second fingerprint sensing electrodes REb are sensing electrodes.

Referring to FIG. 5, the OLED display device 1 may include a driving signal generation part 22a, which provides a driving signal TX to a plurality of driving electrodes in an inactive area, a sensing part 22b, which detects capacitance of the sensing capacitor C1,1 through Cj,i formed between the driving electrodes and a plurality of sensing electrodes, and the sensing controller 21, which controls operations of the driving signal generation part 22a and the sensing part 22b. Here, the driving signal generation part 22a and the sensing part 22b may be included in the fingerprint sensing processor 22 of FIG. 2.

The driving signal generation part 22a is electrically connected to the driving electrodes via a plurality of driving lines and provides driving signals TX1 through TXi to the driving electrodes. For example, the driving signal generation part 22a may sequentially provide the driving signals TX1 through TXi to the driving electrodes or may provide the driving signals TX1 through TXi to at least two of the driving electrodes at the same time.

The sensing part 22b is electrically connected to the sensing electrodes via a plurality of sensing lines and provides sensing signals RX1 through RXi to the sensing electrodes. The sensing part 22b detects the capacitances of the sensing capacitors C1,1 through Cj,i between the driving electrodes, to which the driving signals TX1 through TXi are applied, and the sensing electrodes, which correspond to the driving electrodes. In a case where a fingerprint touch event occurs from the outside, the shape of a fingerprint may be recognized based on any variations in the capacitances of the sensing capacitors C1,1 through Cj,i.

The sensing controller 21 may control the driving signal generation part 22a to sequentially or simultaneously drive the driving lines in accordance with a clock signal provided by the application processor 11.

The sensing controller 21 may compare the shape of a recognized fingerprint with user fingerprint information input to the memory 23. For example, the sensing controller 21 may image fingerprint information from a sensing signal provided by the sensing part 22b.

A fingerprint management method will hereinafter be described.

Figure 6:
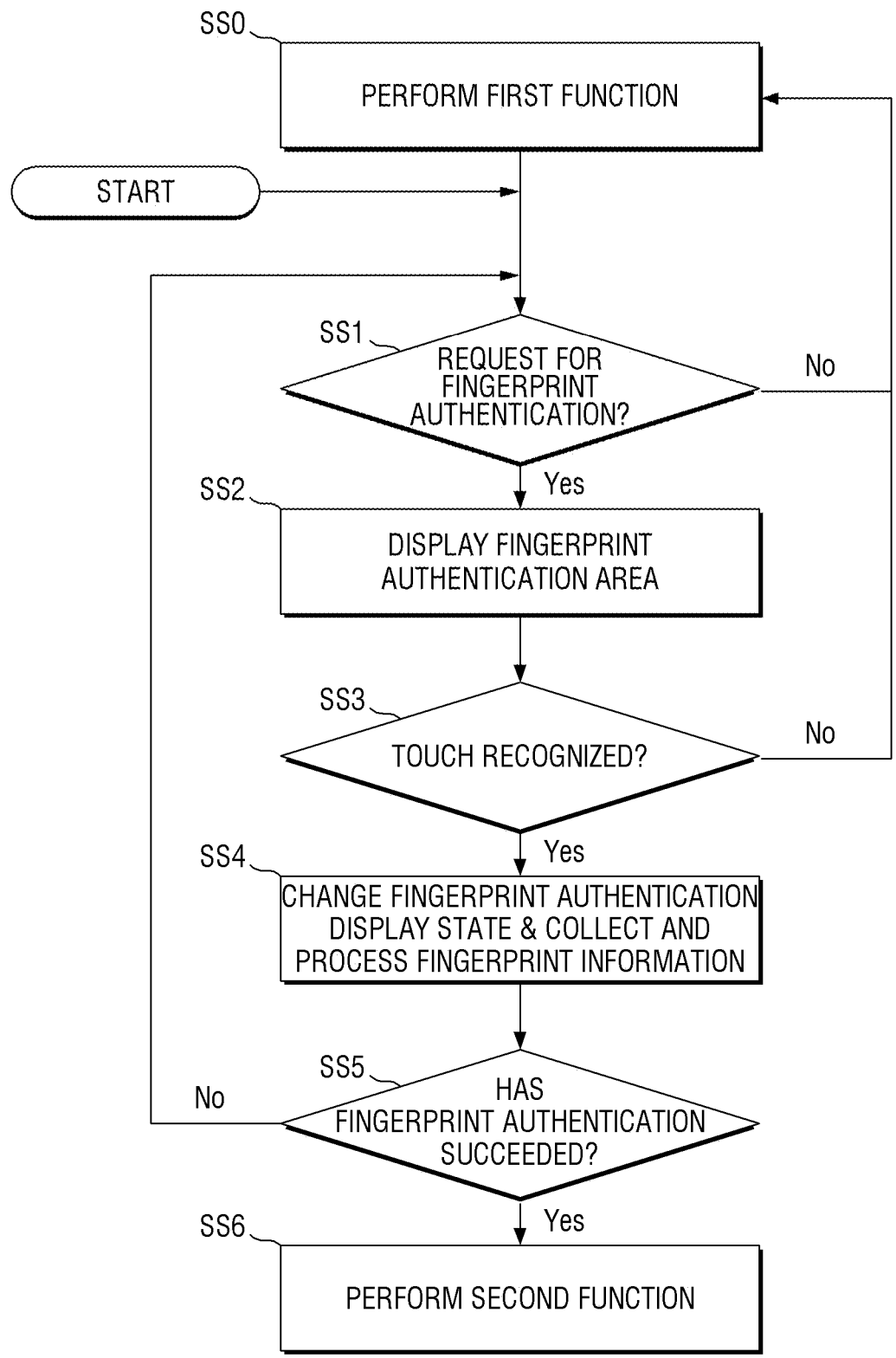
FIG. 6 is a flowchart illustrating a fingerprint management method according to an exemplary embodiment of the present disclosure.

FIG. 6 is a flowchart illustrating a fingerprint management method according to an exemplary embodiment of the present disclosure. FIGS. 7A, 7B, 8, 9, 10A, and 10B are schematic views illustrating changes in display state values in a display area in accordance with the fingerprint management method of FIG. 6.

The fingerprint management method according to an exemplary embodiment of the present disclosure includes steps that require fingerprint recognition and steps that do not require fingerprint recognition.

Figure 10A:
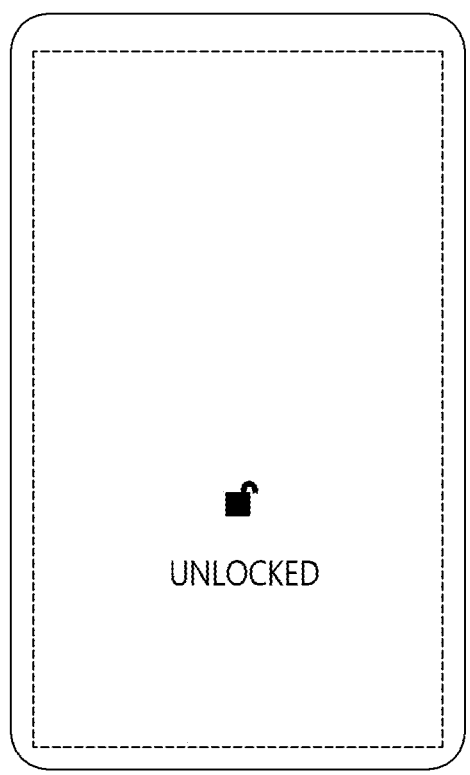
Figure 10B:
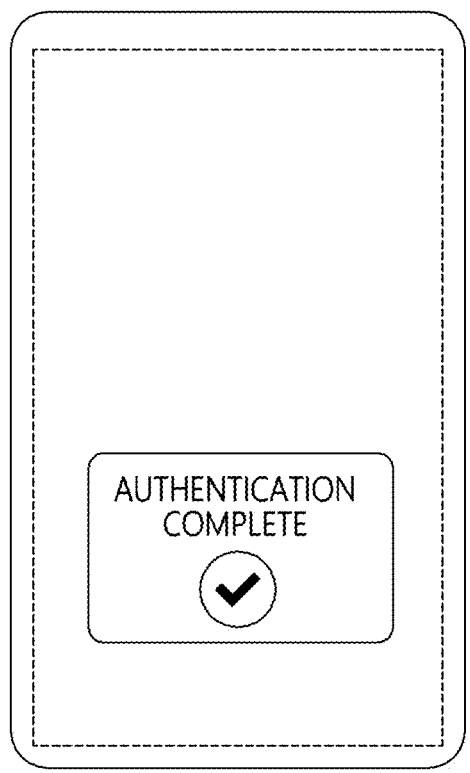

Referring to FIGS. 6, 10A, and 10B, a fingerprint management method of the OLED display device 1 may include, between the steps of performing a first function (SS0) and performing a second function (SS6), the steps of: detecting a request for fingerprint authentication (SS1); displaying a fingerprint authentication area (SS2); determining whether a touch input from the user is detected or recognized (SS3); changing a fingerprint authentication display state and collecting and processing fingerprint information (SS4); and determining whether an input fingerprint has been successfully authenticated by determining whether the input fingerprint matches registered fingerprint information (SS5).

SS1 and SS2 may be steps that do not require or prior to fingerprint recognition, and SS3, SS4, and SS5 may be steps that substantially require or during fingerprint recognition.

Figure 7A:
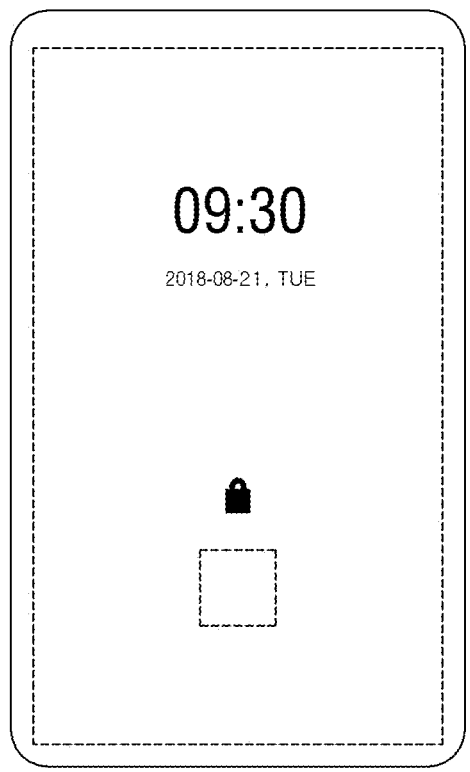
FIGS. 7A, 7B, 8, 9, 10A, and 10B are schematic views illustrating changes in display state values in a display area in accordance with the fingerprint management method of FIG. 6.
Figure 7B:
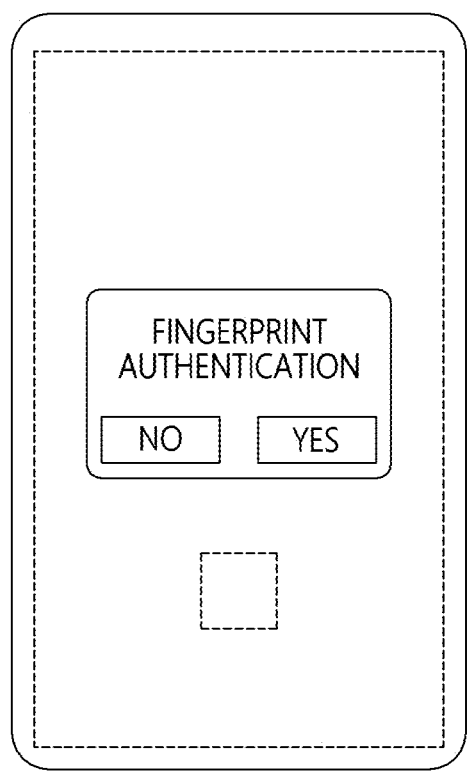

In SS0, the OLED display device 1 performs a first function before the occurrence of an event that requires fingerprint authentication. For example, the first function may correspond to a state in which the OLED display device 1 is locked with its display screen off, as illustrated in FIG. 7A) or is on standby, or a state in which a program that requires fingerprint authentication is executed, as illustrated in FIG. 7B.

Figure 8:
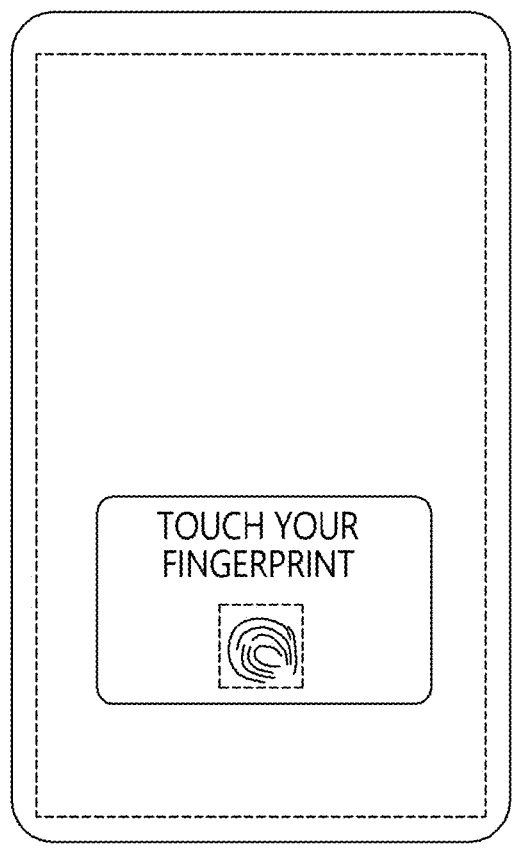

An event that requires fingerprint recognition may occur during the performing of the first function. Then, in SS1, the OLED display device 1 may request fingerprint authentication with its display screen on. For example, as illustrated in FIG. 8, the display screen of the OLED display device 1 may be maintained to be turned on, a fingerprint authentication area may be displayed (as performed in SS2), and the fingerprint sensing unit of the OLED display device 1 may be on standby for fingerprint authentication.

In one exemplary embodiment, when the fingerprint authentication area is activated, the driving state of pixels overlapping with the fingerprint sensing area FA may change. For example, in a case where the display screen of the OLED display device 1 is maintained to be turned on, the pixels in the display area DA may be driven at a first frequency FR1 (of FIG. 11) before the activation of the fingerprint authentication area, and after the activation of the fingerprint authentication area, the pixels overlapping with the fingerprint authentication area may be driven at a second frequency FR2 (of FIG. 11), which is lower than the first frequency FR1. This will be described later.

Figure 9:
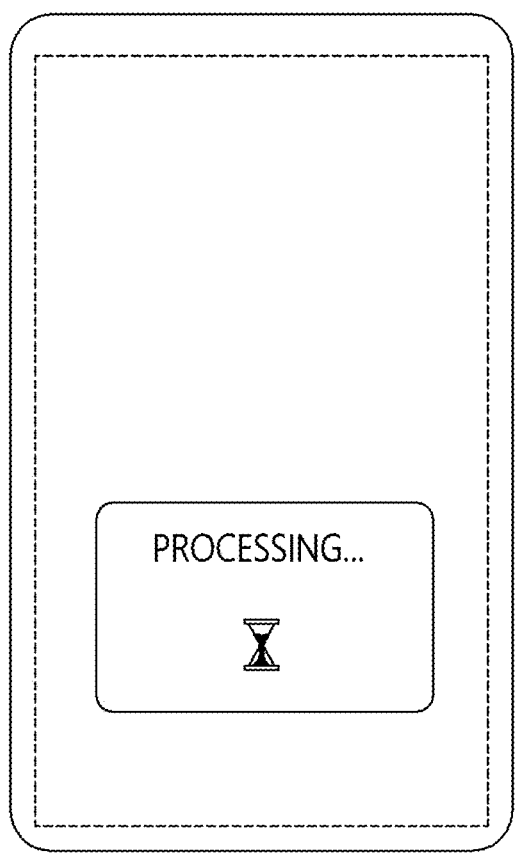

In a case where the fingerprint authentication area is touched, the fingerprint authentication display state changes as illustrated in FIG. 9, and the step of collecting and processing fingerprint information, i.e., SS4, is performed. If the fingerprint authentication area is not touched, a determination may be made that fingerprint authentication is not wanted, and the fingerprint management method of the OLED display device 1 returns to the step of performing the first function, i.e., SS0. SS4 may include allowing the sensing controller 21 to image an input fingerprint and to compare the input fingerprint with the user fingerprint information registered in the memory 23.

Once the recognition of the input fingerprint succeeds in accordance with SS4, the fingerprint management method of the OLED display device 1 proceeds to the step of performing a second function, i.e., SS6. For example, the second function may correspond to a state where the OLED display device 1 is unlocked, as illustrated in FIG. 10A, or a state where fingerprint authentication required by a predetermined program is complete, as illustrated in FIG. 10B. If the input fingerprint does not match the fingerprint information stored in the memory 23 (i.e., if fingerprint authentication fails), the fingerprint management method of the OLED display device 1 returns to SS1.

The above-mentioned fingerprint management method of the OLED display device 1 is merely exemplary, and various other fingerprint management methods may be used.

A driving method of the OLED display device 1 and the arrangement of the elements of the OLED display device 1 will hereinafter be described.

FIG. 11 is a timing diagram illustrating scan signals provided to pixels overlapping with a fingerprint authentication area during fingerprint management.

Referring to FIG. 11, the period of application of the scan signal s1 may sequentially include a first period T1 during which the scan signal s1 has the first frequency FR1, a second period T2 during which the scan signal s1 has the second frequency FR2, which is lower than the first frequency FR1, and a third period T3 during which the scan signal s1 has the first frequency FR1 again. That is, the frequency of the scan signal s1 may vary before and after an actual fingerprint authentication period.

The pixels overlapping with the fingerprint authentication area may be driven at the first frequency FR1 in steps that require fingerprint recognition and may be driven at the second frequency FR2, which is lower than the first frequency FR1, in steps that do not require fingerprint recognition.

The first period T1 may correspond to steps SS0 and SS1 of FIG. 6 in a case where an event that requires fingerprint recognition occurs when the first function is being performed. In one exemplary embodiment, the first frequency FR1 may be a high frequency of 60 Hz or greater and 120 Hz or less, but the exemplary embodiments are not limited thereto. In another exemplary embodiment, the first frequency FR1 may be a higher frequency of 120 Hz or greater and 250 Hz or less.

The second period T2 may correspond to steps SS2, SS3, and SS4 of FIG. 6. In one exemplary embodiment, the second frequency FR2 may be a low frequency of 0.1 Hz to 20 Hz, but the exemplary embodiments are not limited thereto. The pixels overlapping with the fingerprint sensing area FA may be in an off state with no signals provided thereto, and this will be described later in detail.

The third period T3 may correspond to steps following SS4, i.e., steps SS5 and SS6 of FIG. 6.

Scan signals may be sequentially provided to the pixels. For example, first through n-th scan signals s1 through sn may be sequentially transmitted to first through n-th pixel rows, respectively, during each given period of time. However, the pattern of application of the first through n-th scan signals s1 through sn is not particularly limited. In another example, the first through n-th scan signals s1 through sn may be simultaneously provided to the first through n-th pixel rows, respectively.

For convenience, it is assumed that the OLED display device 1 performs 60 Hz frequency driving during the first and third periods T1 and T3 and 1 Hz frequency driving during the second period T2.

First frequency driving and third frequency driving mode may correspond to a normal driving mode, and second frequency driving may correspond to a frame skip driving mode.

The pixel controller 31 may increase the frame rate (or frame frequency) of an input image in the normal driving mode N times (where N is a positive integer value of 2 or greater) and may control the driving frequency of a display panel driver at the increased frame rate. For example, in a case where 60 Hz frame rate driving is performed during the first and third periods T1 and T3, in the normal driving mode, the amount of time that it takes to sequentially provide scan signals to all n pixel rows is 1/60 seconds, and the duration for which each of the n pixel rows is provided with a scan signal is 1/60n seconds. That is, each of the n pixel rows may be provided with a scan signal for 1/60n seconds at intervals of 1/60 seconds.

In the frame skip driving mode, in a case where the pixel controller 31 performs 1 Hz frame rate driving, the amount of time that it takes to provide scan signals to all the n pixel rows is the same as in the normal driving mode, and the interval at which each of the n pixel rows is provided with a scan signal is one second. For example, each of the n pixel rows may be provided with a scan signal for 1/60 seconds first, and one second later, may be provided with the scan signal again for 1/60 seconds.

During the second period T2, during which fingerprint authentication is actually performed, a scan signal having the second frequency FR2, which is a relatively low frequency, is applied to the pixels in the fingerprint sensing area FA, thereby reducing noise that can be caused by signals generated in the pixels in the fingerprint sensing area FA. Accordingly, the signal-to-noise ratio (SNR) of a fingerprint sensing signal can be improved.

All the pixels in the display area DA have been described above as being provided with scan signals whose frequency is variable, but the exemplary embodiments are not limited thereto. For example, during the first and third periods T1 and T3, only the pixels overlapping with the fingerprint sensing area FA may be provided with scan signals having the first frequency FR1, and during the second period T2, all the pixels in the display area DA may be provided with scan signals having the second frequency FR2. In one exemplary embodiment, pixels overlapping with an area other than the fingerprint sensing area FA may be provided with scan signals with the first frequency FR1 throughout all the first, second, and third periods T1, T2, and T3. That is, the pixels overlapping with the non-fingerprint sensing area NFA may be driven at the first frequency FR1 in steps that do not require fingerprint recognition and may be driven at the second frequency FR2 in steps that require fingerprint recognition like the pixels overlapping with the fingerprint sensing area FA. In other words, the pixels overlapping with the non-fingerprint sensing area NFA may sequentially experience the first, second, and third periods T1, T2, and T3 like the pixels overlapping with the fingerprint sensing area FA. However, the exemplary embodiments of the present disclosure are not limited to this. The pixels overlapping with the non-fingerprint sensing area NFA may continue to be provided with scan signals with the first frequency FR1 regardless of the type of fingerprint management method.

The arrangement of the fingerprint sensing unit and the cross-sectional structure of the OLED display device 1 will hereinafter be described.

Figure 12:
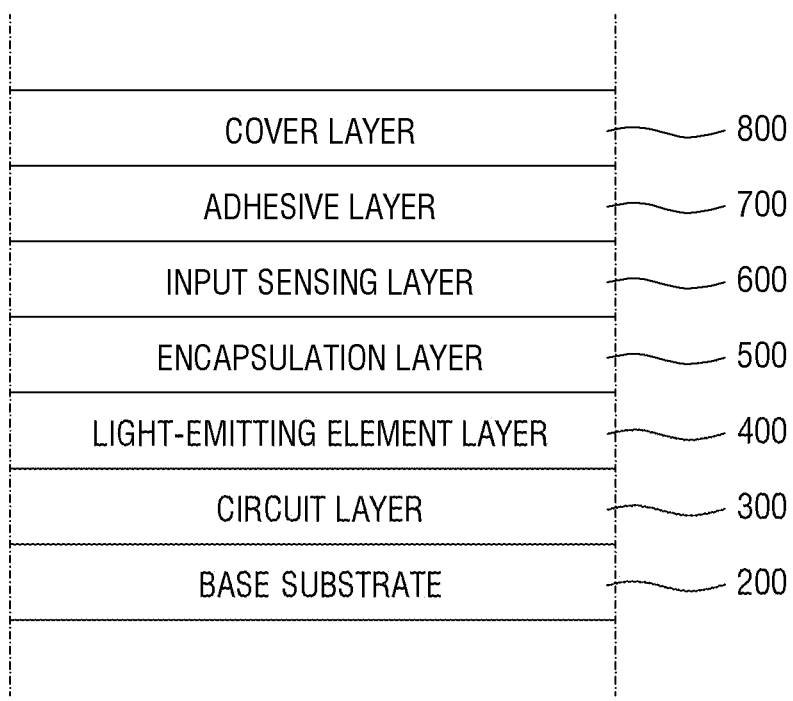
FIG. 12 is a cross-sectional view illustrating the stack structure of the OLED display device of FIG. 1.
Figure 13:
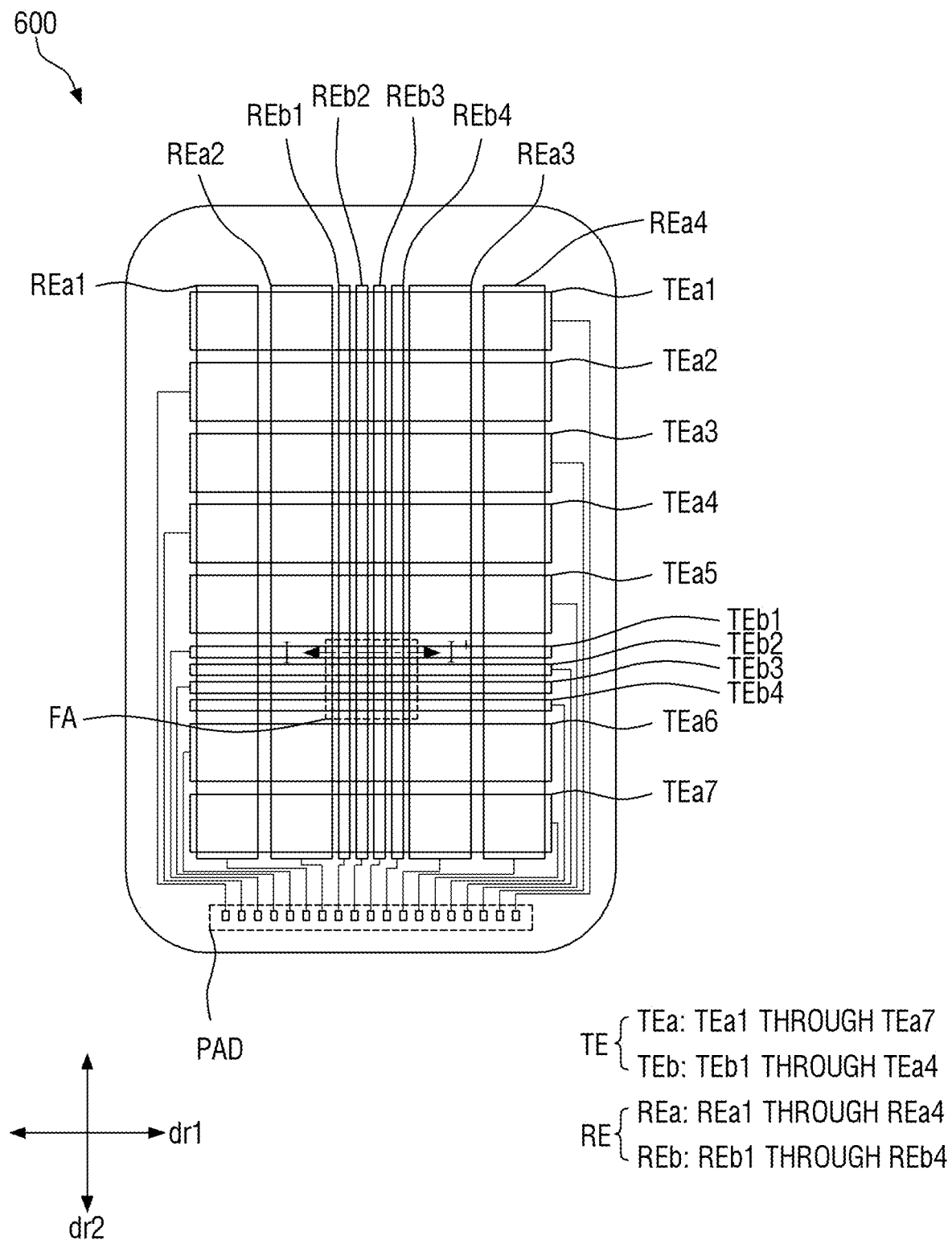
FIG. 13 is a layout view of an input sensing layer illustrated in FIG. 12.
Figure 14:
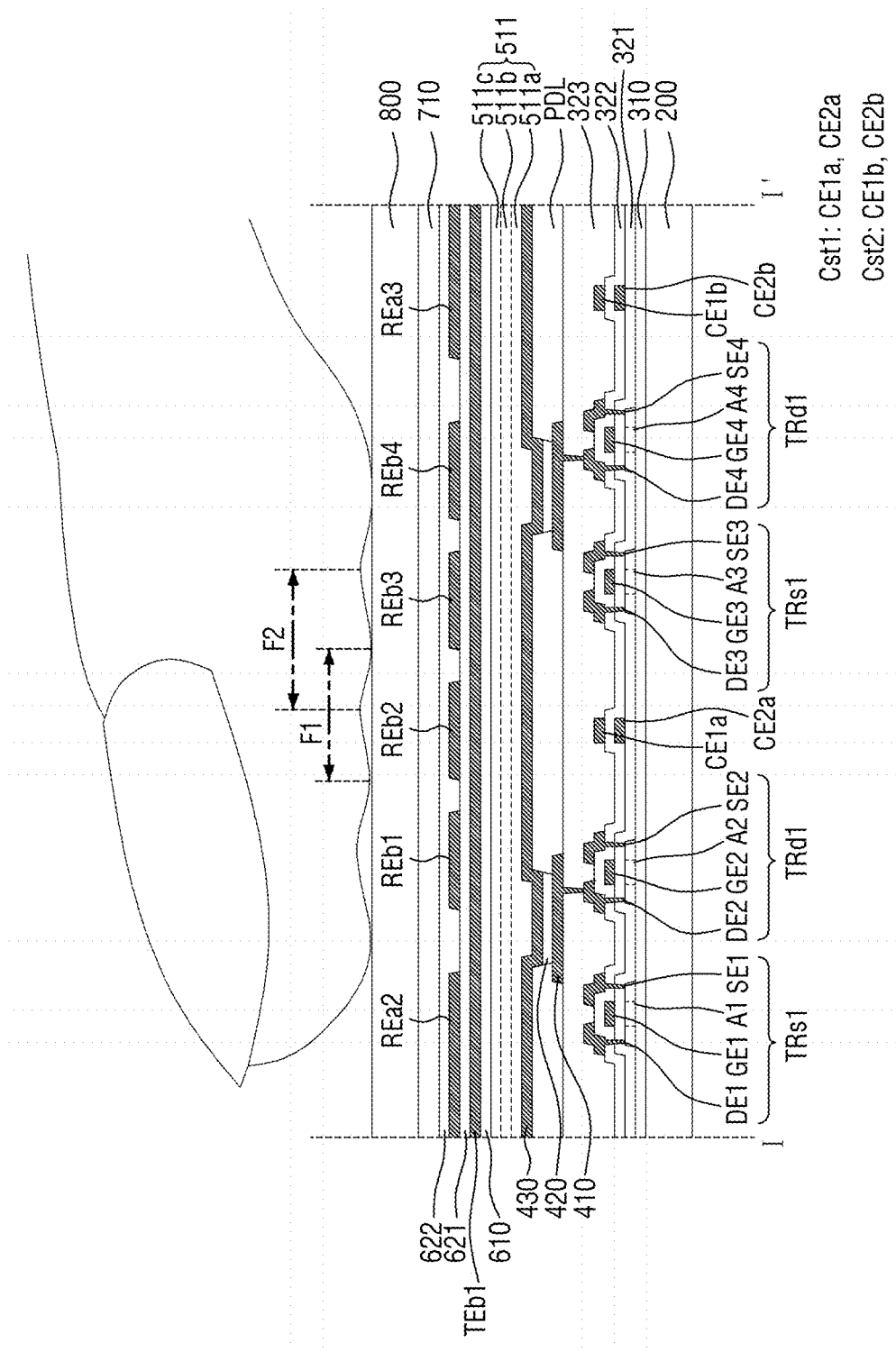
FIG. 14 is a cross-sectional view taken along a sectional line I-I' of FIG. 13.

FIG. 12 is a cross-sectional view illustrating the stack structure of the OLED display device 1 of FIG. 1. FIG. 13 is a layout view of an input sensing layer illustrated in FIG. 12. FIG. 14 is a cross-sectional view taken along a sectional line I-I' of FIG. 13.

Referring to FIGS. 12, 13, and 14, in one exemplary embodiment, the OLED display device 1 may include a base substrate 200, a circuit layer 300 disposed on one surface of the base substrate 200, a light-emitting element layer 400 disposed on the circuit layer 300, an encapsulation layer 500 disposed on the light-emitting element layer 400, an input sensing layer 600 disposed on the encapsulation layer 500, an adhesive layer 700 disposed on the input sensing layer 600, and a cover layer 800 disposed on the adhesive layer 700, but the exemplary embodiments are not limited thereto. Each of the layers of the OLED display device 1 may have a single or multilayer structure. Some of the layers of the OLED display device 1 may be omitted, or other layers may be added to the OLED display device 1 as necessary. In other exemplary embodiments, the input sensing layer 600 may be disposed on the bottom of the base substrate 200.

The planar arrangement and the stack structure of the fingerprint sensing unit provided in the input sensing layer 600 will hereinafter be described.

The input sensing layer 600 includes the fingerprint sensing unit. In one exemplary embodiment, the input sensing layer 600 may include fingerprint sensing unit-integrated touch sensing electrodes, but the exemplary embodiments are not limited thereto. In another exemplary embodiment, the OLED display device 1 may include a fingerprint sensing unit separate from touch sensing electrodes.

The input sensing layer 600 includes a plurality of sensing electrodes (TE and RE) and a pad unit PAD. The input sensing layer 600 further includes a plurality of wires connecting the first and second sensing electrodes TE and RE and the pad unit PAD.

The input sensing layer 600 may include a plurality of first sensing electrodes TE, which extend in the first direction dr1, and a plurality of second sensing electrodes RE, which extend in the second direction dr2. The first sensing electrodes TE and the second sensing electrodes RE may be disposed to intersect each other. The first sensing electrodes TE and the second sensing electrodes RE may be disposed in different layers with the first sensing insulating layer 621 interposed therebetween and may thus be insulated from each other. The first sensing electrodes TE and the second sensing electrodes RE may have a rectangular shape with a pair of long sides and a pair of short sides, but the exemplary embodiments are not limited thereto. Alternatively, the first sensing electrodes TE and the second sensing electrodes RE may have a rhombus shape or a mesh shape.

The first sensing electrodes TE may include first fingerprint sensing electrodes TEb having short sides with a first length and first touch sensing electrodes TEa having short sides with a second length, which is greater than the first length. Similarly, the second sensing electrodes RE may include second fingerprint sensing electrodes REb having short sides with a third length and second touch sensing electrodes REa having short sides with a fourth length, which is greater than the third length. In one exemplary embodiment, the first and third lengths may be the same, and the second and fourth lengths may be the same. In one exemplary embodiment, the first and third lengths may be 0.2 mm to 1.0 mm, and the second and fourth lengths may be 3 mm to 6 mm.

The first and second touch sensing electrodes TEa and REa may be electrodes capable of recognizing touch input from the user. The first and second fingerprint sensing electrodes TEb and REb may have short sides that are shorter than distances F2 or F1 between a pair of adjacent ridges or valleys of a fingerprint of the user and may thus be electrodes for acquiring fingerprint information of the user. That is, the fingerprint sensing area FA may be defined at the intersections between the first fingerprint sensing electrodes TEb and the first touch sensing electrodes TEa.

A human fingerprint includes multiple ridges and valleys between the multiple ridges. Since a driving signal is provided to driving electrodes and a sensing signal is provided to sensing electrodes, an electric field may be generated between the driving electrodes and the sensing electrodes, and the sensing capacitors may have a uniform capacitance unless a touch event occurs. Once the fingerprint sensing area FA is touched by a human fingerprint, the electric field between the driving electrodes and the sensing electrodes may be changed by the ridges and the valleys of the human fingerprint, and fingerprint information of the human fingerprint may be acquired based on detected capacitance variations. Accordingly, the distance between the first and second fingerprint sensing electrodes TEb and REb may preferably be smaller than the distances F1 or F2. In one exemplary embodiment, the distance between the first fingerprint sensing electrodes TEb and the distance between the second fingerprint sensing electrodes REb may be 0.2 mm to 1.0 mm.

The first touch sensing electrodes TEa may include first through seventh touch driving electrodes TEa1 through TEa7, which are disposed adjacent to one another in the second direction dr2. The first fingerprint sensing electrodes TEb may include first through fourth fingerprint driving electrodes TEb1 through TEb4. In one exemplary embodiment, the first through fourth fingerprint driving electrodes TEb1 through TEb4 may be disposed between a pair of adjacent first touch sensing electrodes TEa. For example, the first through fourth fingerprint driving electrodes TEb1 through TEb4 may be disposed between the fifth and sixth touch driving electrodes TEa5 and TEa6. However, no first touch sensing electrodes TEa may be disposed between a pair of adjacent first fingerprint sensing electrodes TEb.

The second touch sensing electrodes REa may include first through fourth touch sensing electrodes REa1 through REa4, which are disposed adjacent to one another in the first direction dr1. The second fingerprint sensing electrodes REa may include first through fourth fingerprint sensing electrodes REa1 through REa4. In one exemplary embodiment, the first through fourth fingerprint sensing electrodes REa1 through REa4 may be disposed between a pair of adjacent second touch sensing electrodes REa. For example, the first through fourth fingerprint sensing electrodes REa1 through REa4 may be disposed between the second and third touch driving electrodes REa2 and REa3. However, no second touch sensing electrodes REa may not be disposed between a pair of adjacent second fingerprint sensing electrodes REb.

The first sensing electrodes TE and the second sensing electrodes RE may be electrically connected to the pad unit PAD via sensing wires. The sensing wires may be connected to first sides of the first sensing electrodes TE and the second sensing electrodes RE or to both the first sides and second sides of the first sensing electrodes TE and the second sensing electrodes RE and may extend along the inactive area to be connected to the pad unit PAD.

The number of the first and second touch sensing electrodes TEa and REa and the number of the first and second fingerprint sensing electrodes TEb and REb are not particularly limited. The first and second fingerprint sensing electrodes TEb and REb may be disposed between the first and second touch sensing electrodes TEa and REa.

The base substrate 200 may be a rigid substrate. Here, the base substrate 200 may be one of a glass substrate, a quartz substrate, a glass ceramic substrate, and a crystalline glass substrate, but the exemplary embodiments are not limited thereto. Alternatively, the base substrate 200 may be a flexible substrate.

A buffer layer 310 may be disposed on the base substrate 200. The buffer layer 310 planarizes the surface of the base substrate 200 and prevents or reduces the infiltration of moisture or external air. The buffer layer 310 may be an inorganic film. The buffer layer 310 may be a single- or multilayer film. The buffer layer 310 may be optional.

A plurality of TFTs TRs1, TRs2, TRd1, and TRd2 and a plurality of storage capacitors Cst1 and Cst2 may be disposed on the buffer layer 310. The TFTs TRs1, TRs2, TRd1, and TRd2 may include driving transistors TRd1 and TRd2 and switching transistors TRs1 and TRs2. At least one driving transistor and at least one switching transistor may be provided in each pixel.

The plurality of TFTs TRs1, TRs2, TRd1, and TRd2 may include semiconductor layers A1, A2, A3, and A4, respectively, gate electrodes GE1, GE2, GE3, and GE4, respectively, source electrodes SE1, SE2, SE3, and SE4, respectively, and drain electrodes DE1, DE2, DE3, and DE4, respectively.

Specifically, a first conductive layer is disposed on the buffer layer 310. The first conductive layer may include the semiconductor layers A1, A2, A3, and A4. The semiconductor layers A1, A2, A3, and A4 may include amorphous silicon, polysilicon, low-temperature polysilicon, or an organic semiconductor. Alternatively, the semiconductor layers A1, A2, A3, and A4 may include an oxide semiconductor. Each of the semiconductor layers A1, A2, A3, and A4 may include a channel region and source and drain regions disposed on both sides of the channel region and doped with impurities.

A gate insulating film 321 is disposed on the first conductive layer. The gate insulating film 321 may be an inorganic film. The gate insulating film 321 may be a single- or multilayer film.

A second conductive layer is disposed on the gate insulating film 321. The second conductive layer may include the gate electrodes GE1, GE2, GE3, and GE4 and the first capacitor electrodes CE1a and CE1b of the storage capacitors Cst1 and Cst2. The second conductive layer may be formed of a metal material with conductivity. For example, the gate electrodes GE1, GE2, GE3, and GE4 may include molybdenum (Mo), aluminum (Al), copper (Cu), or titanium (T1). The gate electrodes GE1, GE2, GE3, and GE4 may be single-multilayer films.

An interlayer insulating film 322 is disposed on the second conductive layer. The interlayer insulating film 322 may be an inorganic film. The interlayer insulating film 322 may be a single or multilayer film.

A third conductive layer is disposed on the interlayer insulating film 322. The third conductive layer may include the source electrodes SE1, SE2, SE3, and SE4, the drain electrodes DE1, DE2, DE3, and DE4, and the second capacitor electrodes CE2a and CE2b of the storage capacitors Cst1 and Cst2. The third conductive layer may include a metal material with conductivity such as Al, Cu, T1, or Mo.

The source electrodes SE1, SE2, SE3, and SE4 and the drain electrodes DE1, DE2, DE3, and DE4 may be electrically connected to the source regions and the drain regions of the semiconductor layers A1, A2, A3, and A4 via contact holes that penetrate the interlayer insulating film 322 and the gate insulating film 321.

A protective layer 323 is disposed on the third conductive layer. Here, the protective layer 323 is disposed to cover a pixel circuit unit including the TFTs TRs1, TRs2, TRd1, and TRd2. The protective layer 323 may be a passivation film or a planarization film. The passivation film may include $SiO_2$ or SiNx, and the planarization film may include an acrylic material or polyimide. The protective layer 323 may include both the passivation film and the planarization film, in which case, the passivation film may be disposed on the source electrodes SE1, SE2, SE3, and SE4, the drain electrodes DE1, DE2, DE3, and DE4, and the interlayer insulating film 322 and the planarization film may be disposed on the passivation film. The top surface of the protective layer 323 may be flat.

The buffer layer 310, the gate insulating film 321, and the protective layer 323 may form the circuit layer 300.

A plurality of first pixel electrodes 410 are disposed on the protective layer 323. The first pixel electrodes 410 may be provided in the pixels. The first pixel electrodes 410 may be the anodes of OLEDs.

The first pixel electrodes 410 may be electrically connected to the drain electrodes DE1, DE2, DE3, and DE4 (or the source electrodes SE1, SE2, SE3, and SE4), which are disposed on the base substrate 200, via the contact holes that penetrate the protective layer 323.

The first pixel electrodes 410 may include a material with a high work function. The first pixel electrodes 410 may include indium tin oxide (ITO), indium zinc oxide (IZO), zinc oxide (ZnO), or indium oxide ($In_2O_3$).

A pixel-defining film PDL is disposed on the first pixel electrodes 410. The pixel-defining film PDL includes openings, which at least partially expose the first pixel electrodes 410. The pixel-defining film PDL may include an organic material or an inorganic material. In one exemplary embodiment, the pixel-defining film PDL may include photoresist, a polyimide resin, an acrylic resin, a silicone compound, or a polyacrylic resin.

The organic light-emitting layer 420 is disposed on parts of the first pixel electrodes 410 exposed by the pixel-defining film PDL.

A second pixel electrode 430 is disposed on the organic light-emitting layer 420. The second pixel electrode 430 may be a common electrode disposed in an entire region across all the pixels. The second pixel electrode 430 may be the cathodes of the OLEDs.

The second pixel electrode 430 may include a material with a low work function. The second pixel electrode 430 may include Li, Ca, LiF/Ca, LiF/Al, Al, Mg, Ag, Pt, Pd, Ni, Au Nd, Ir, Cr, BaF, Ba, or a compound or mixture thereof (e.g., the mixture of Ag and Mg). The second pixel electrode 430 may be connected to power wiring 301 through electrodes formed in the same layer as the first pixel electrodes 410.

The first pixel electrodes 410, the organic light-emitting layer 420, and the second pixel electrode 430 may form the OLEDs. The first pixel electrodes 410 and the second pixel electrode 430 may form the light-emitting element layer 400.

An encapsulation film 511 is disposed on the second pixel electrode 430. The encapsulation film 511 may include a stack of a plurality of films. Although not specifically illustrated, the encapsulation film 511 may be formed as a multilayer film in which a first inorganic film 511a, an organic film 511b, and a second inorganic film 511c are sequentially stacked. The first and second inorganic films 511a and 511c may include at least one of silicon oxide SiOx, silicon nitride (SiNx), and silicon oxynitride (SiONx), and the organic film 511b may include at least one of epoxy, acrylate, and urethane acrylate.

A first sensing electrode layer may be disposed on the encapsulation film 511. The first sensing electrode layer may include Mo or a transparent conductive oxide such as ITO, IZO, ZnO, or ITZO.

The encapsulation film 511, which has a multilayer structure, may form the encapsulation layer 500.

In one exemplary embodiment, a base 610 may be further provided between the encapsulation film 511 and a first fingerprint sensing electrode layer. The base 610 may be formed of glass or plastic such as polyethylene terephthalate (PET), polyimide (PI), polycarbonate (PC), polyethylene (PE), polypropylene (PP), polysulfone (PSF), polymethyl methacrylate (PMMA), triacetyl cellulose (TAC), or a cycloolefin polymer (COP). The base 610 may be optional.

A first sensing insulating layer 621 is disposed on the first sensing electrode layer, and a second sensing electrode layer is disposed on the first sensing insulating layer 621. The first sensing insulating layer 621 may insulate the first and second sensing electrode layers from each other. The first sensing insulating layer 621 may include silicon oxide (SiOx), silicon nitride (SiNx), silicon oxynitride, aluminum oxide, tantalum oxide, hafnium oxide, zirconium oxide, or titanium oxide, and these materials may be used alone or in combination with one another. The first sensing insulating layer 621 may be a single-layer film or a multilayer film having a stack of different materials. The second sensing electrode layer may be formed of the same material as the first sensing electrode layer or may include at least one combination of the above-mentioned exemplary materials of the first sensing electrode layer.

A second sensing insulating layer 622 may be disposed on the second sensing electrode layer. The second sensing electrode layer may be formed of the same material as the first sensing insulating layer 621 or may include at least one combination of the above-mentioned exemplary materials of the first sensing insulating layer 621.

The base 610, the first sensing electrode layer, the first sensing insulating layer 621, the second sensing electrode layer, and the second sensing insulating layer 622 may form the input sensing layer 600.

The cover layer 800 may be disposed on the second sensing insulating layer 622 and may be bonded between the input sensing layer 600 and the cover layer 800 by the adhesive layer 700. The adhesive layer 700 may include an optically clear adhesive (OCA) or an optically clear resin (OCR). In one exemplary embodiment, the cover layer 800 may be a window cover and may protect the light-emitting element layer 400, the circuit layer 300, and the input sensing layer 600 from scratches.

OLED display devices according to another exemplary embodiments of the present disclosure will hereinafter be described. Descriptions of elements or features that are the same as those described above with reference to FIGS. 1, 2, 3, 4, 5, 6, 7A, 7B, 8, 9, 10A, 10B, 11, 12, 13, and 14 will be omitted. In FIGS. 1, 2, 3, 4, 5, 6, 7A, 7B, 8, 9, 10A, 10B, 11, 12, 13, 14, 15, 16, 17, 18, 19, 20, and 21, like reference numerals indicate like elements.

Figure 15:
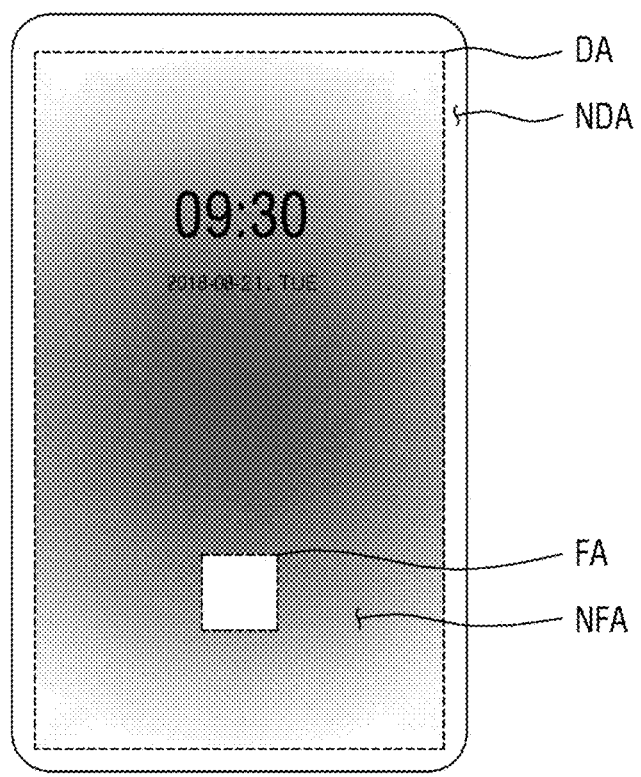
FIG. 15 is a plan view of an OLED display device according to another exemplary embodiment of the present disclosure.

FIG. 15 is a plan view of an OLED display device according to another exemplary embodiment of the present disclosure.

Referring to FIG. 15, an OLED display device 1-1 differs from the OLED display device 1 of FIG. 8 in that pixels overlapping with a fingerprint sensing area FA are in an off state in the steps of displaying a fingerprint authentication area (SS2), determining the presence of touch input from a user (SS3), and changing a fingerprint authentication display state and collecting and processing fingerprint information (SS4).

In the step of displaying a fingerprint authentication area (SS2), the pixels overlapping with the fingerprint sensing area FA may be in an off state. That is, in steps that require fingerprint recognition, the pixels overlapping with the fingerprint sensing area FA may not emit light. During the first and third periods T1 and T3 of FIG. 11, a scan signal having the first frequency FR1 may be provided to the pixels overlapping with the fingerprint sensing area FA, and during the second period T2, a scan signal having a frequency substantially close to 0 Hz may be provided to the pixels overlapping with the fingerprint sensing area FA.

The pixels overlapping with the fingerprint sensing area FA may be maintained to be off in and throughout SS3 and SS4.

Specifically, a fingerprint management method of the OLED display device 1-1 may include, between the steps of performing a first function (SS0) and performing a second function (SS6), the steps of: detecting a request for fingerprint authentication (SS1); displaying a fingerprint authentication area (SS2); turning off the pixels overlapping with the fingerprint sensing area FA; determining the presence of touch input from the user (SS3); changing a fingerprint authentication display state and collecting and processing fingerprint information (SS4); and determining whether an input fingerprint has been successfully authenticated by determining whether the input fingerprint matches registered fingerprint information (SS5). The step of turning off the pixels overlapping with the fingerprint sensing area FA and the step of displaying the fingerprint authentication area, i.e., SS2, may be simultaneously performed, but the exemplary embodiments are not limited thereto. Alternatively, the step of turning off the pixels overlapping with the fingerprint sensing area FA may be performed before or after SS2.

By maintaining the pixels overlapping with the fingerprint sensing area FA to be off during a period when the collection of fingerprint information is actually performed, noise caused by signals generated in the pixels overlapping with the fingerprint sensing area FA can be reduced. Accordingly, the SNR of a fingerprint sensing signal can be improved.

Figure 16:
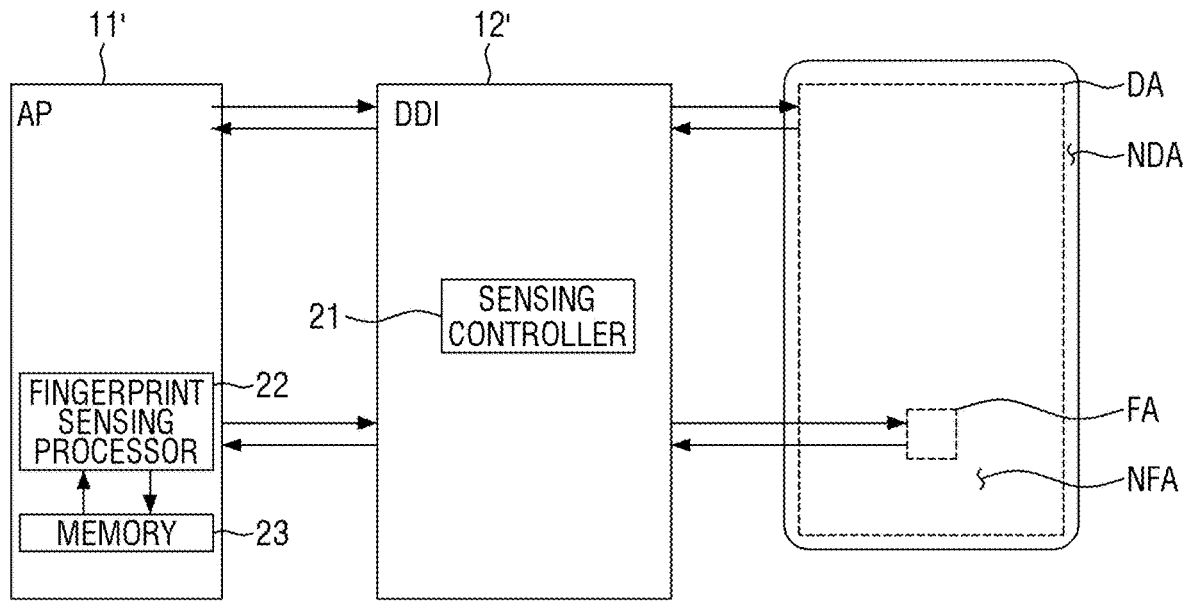
FIG. 16 is a block diagram of an OLED display device according to another exemplary embodiment of the present disclosure.

FIG. 16 is a block diagram of an OLED display device according to another exemplary embodiment of the present disclosure.

Referring to FIG. 16, an OLED display device 2 differs from the OLED display device 1 of FIG. 2 in that a sensing controller 21 is included in an application processor 11'.

The OLED display device 2 may include the application processor 11', a DDI 12', and a display panel 13. The application processor 11' may include a fingerprint sensing processor 22 and a memory 23.

In a case where a fingerprint touch event occurs, fingerprint information may be input to the fingerprint sensing processor 22 in the application processor 11' via a fingerprint sensing unit of the display panel 13 and the DDI 12', and the input fingerprint information may be imaged and compared with fingerprint information stored in the memory 23.

In a case where the fingerprint sensing processor 22 and the memory 23 are included in the application processor 11', the manufacturing cost of the DDI 12' can be reduced.

Figure 17:
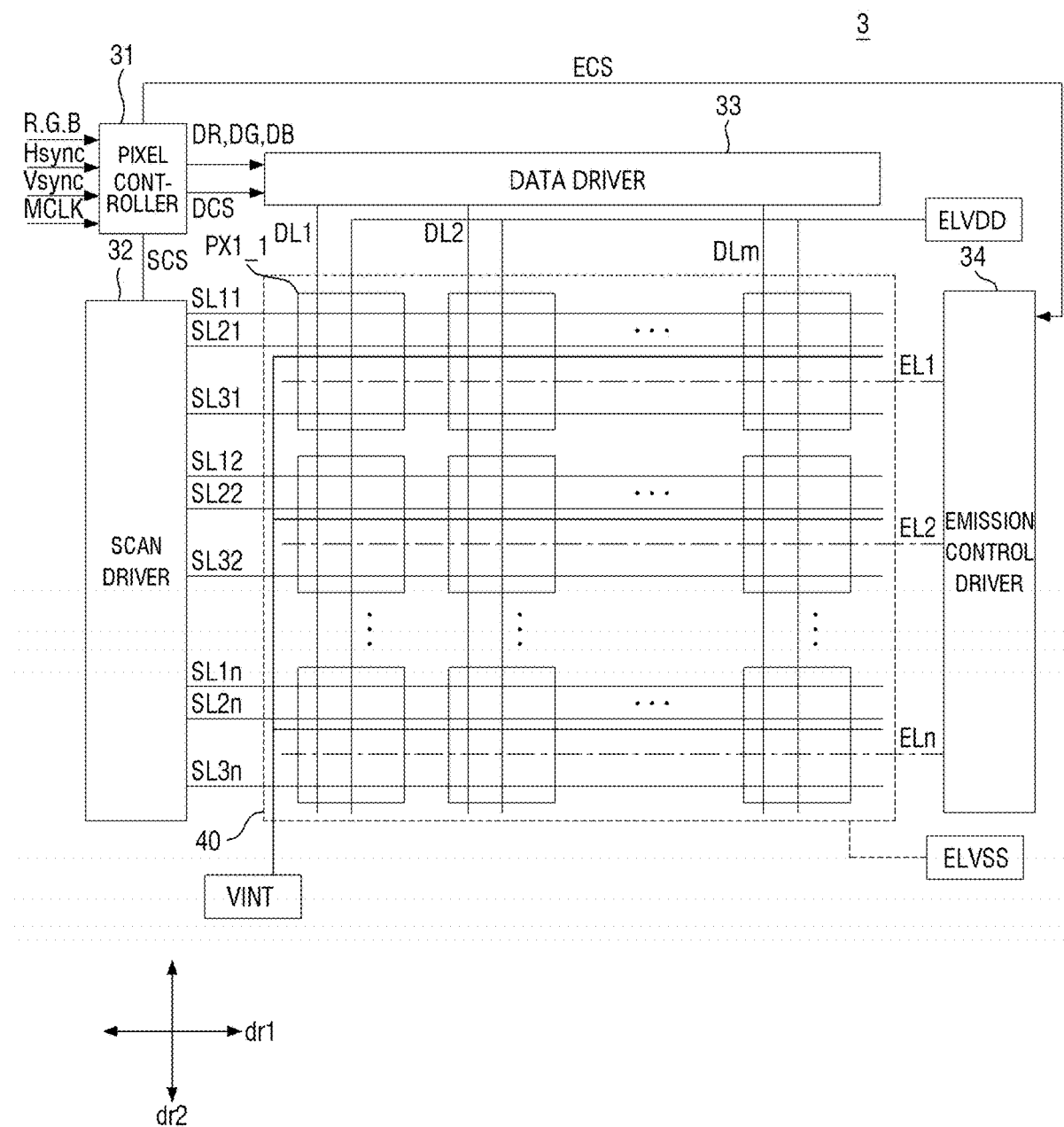
FIG. 17 is a block diagram of an OLED display device according to another exemplary embodiment of the present disclosure.
Figure 18:
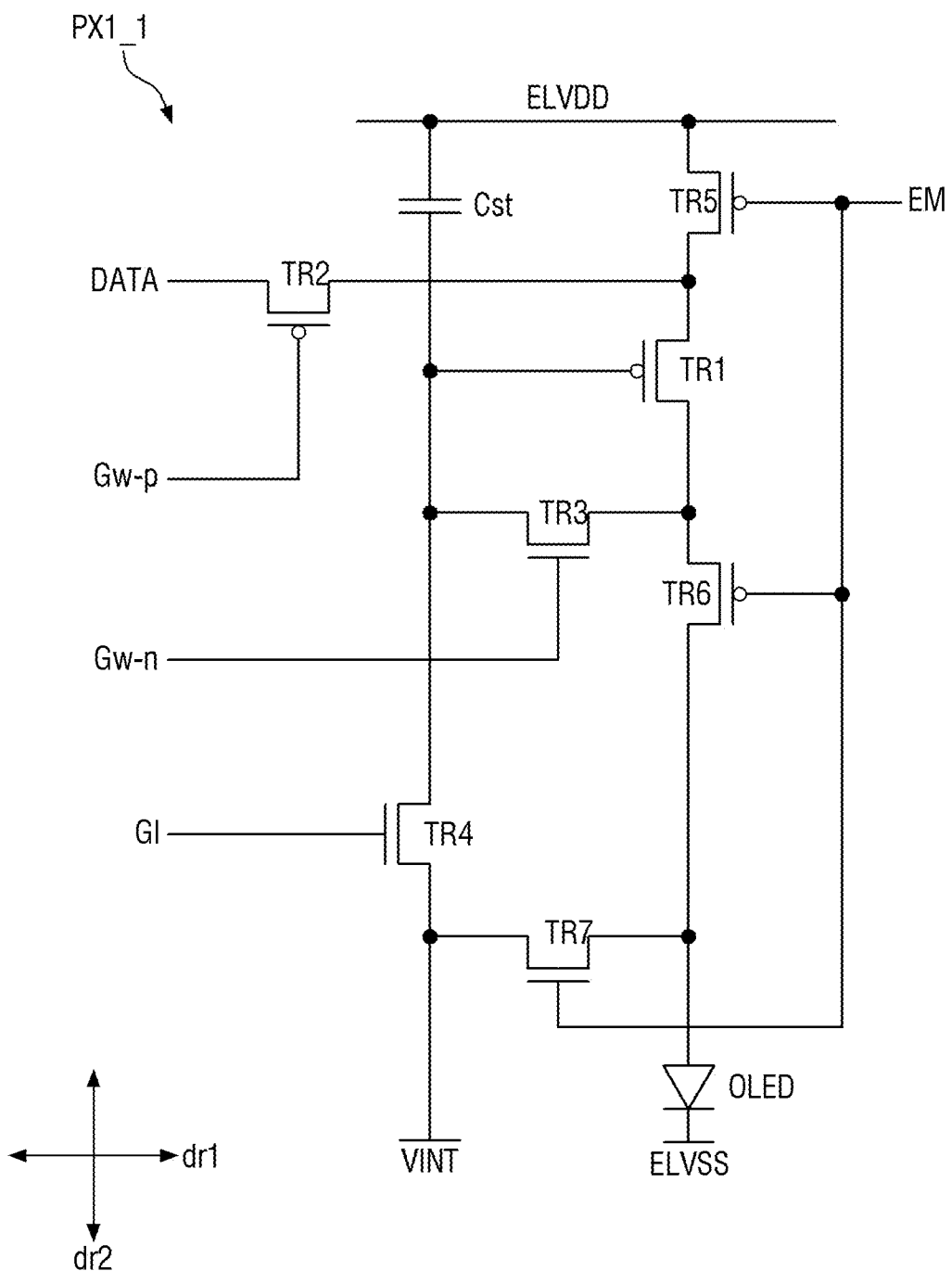
FIG. 18 is an equivalent circuit diagram of a pixel of the OLED display device of FIG. 17.
Figure 19:
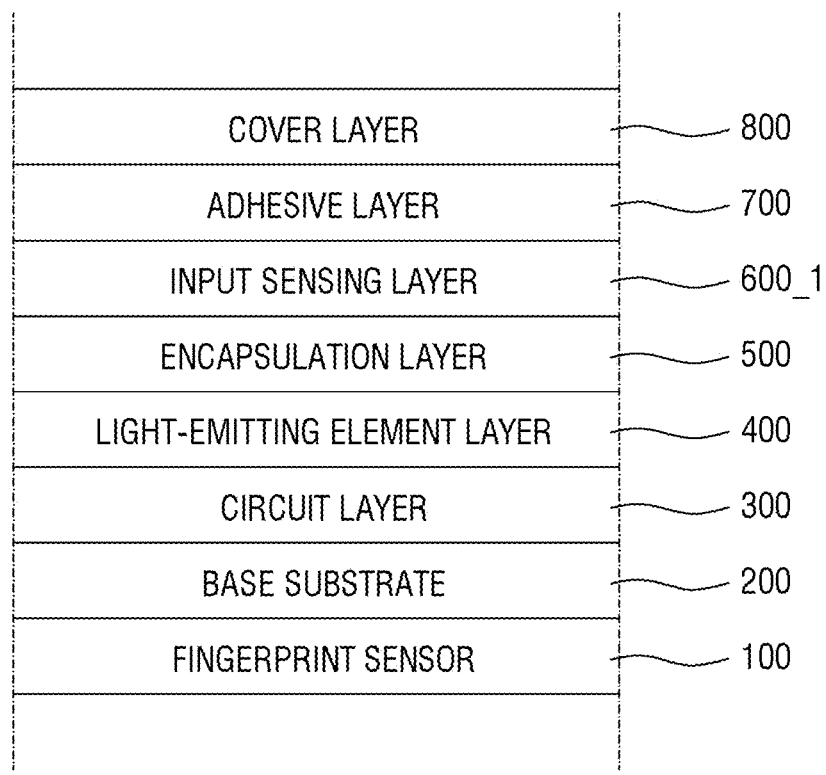
FIG. 19 is a cross-sectional view illustrating the stack structure of the OLED display device of FIG. 17.
Figure 20:
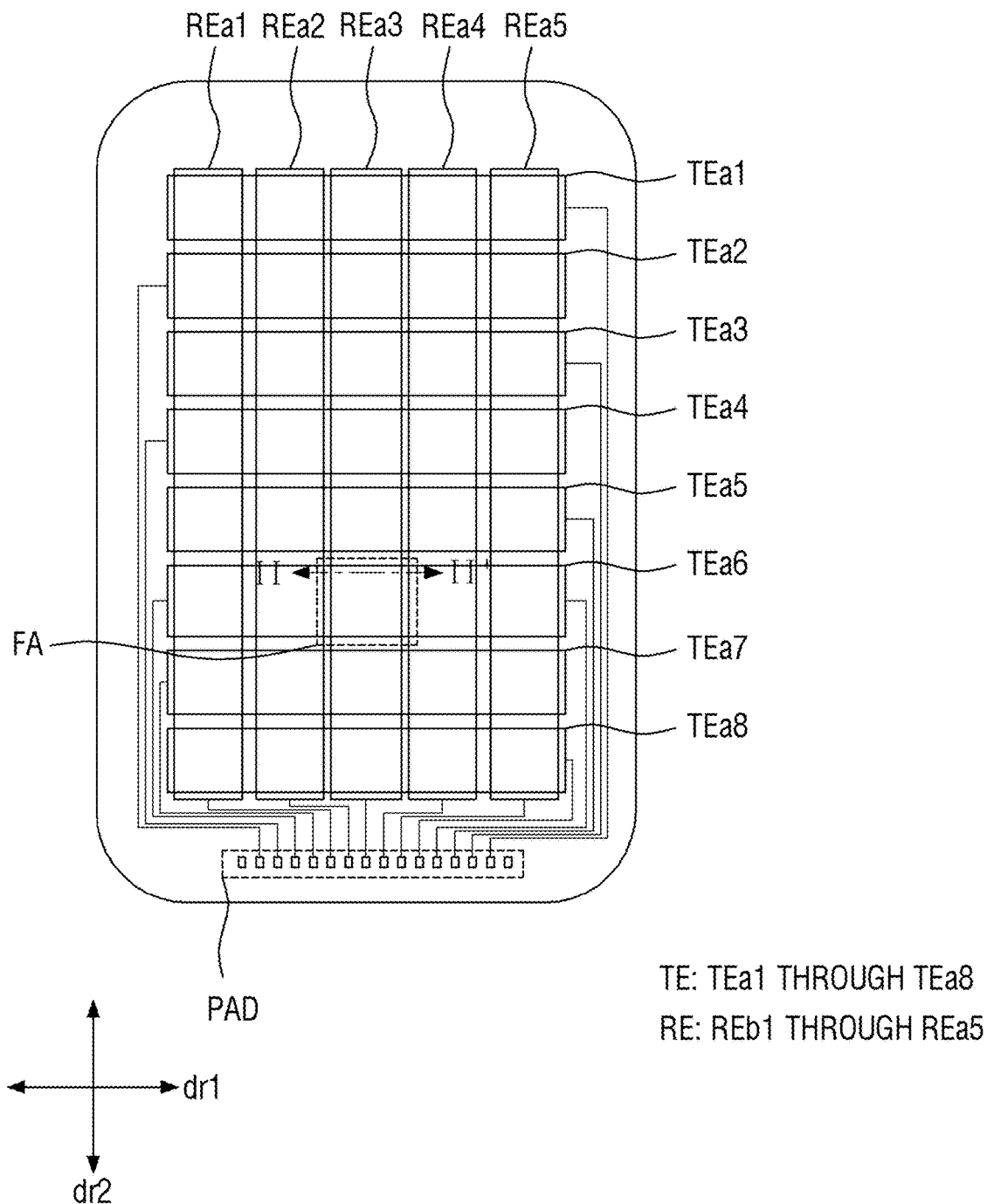
FIG. 20 is a layout view of an input sensing layer illustrated in FIG. 19.
Figure 21:
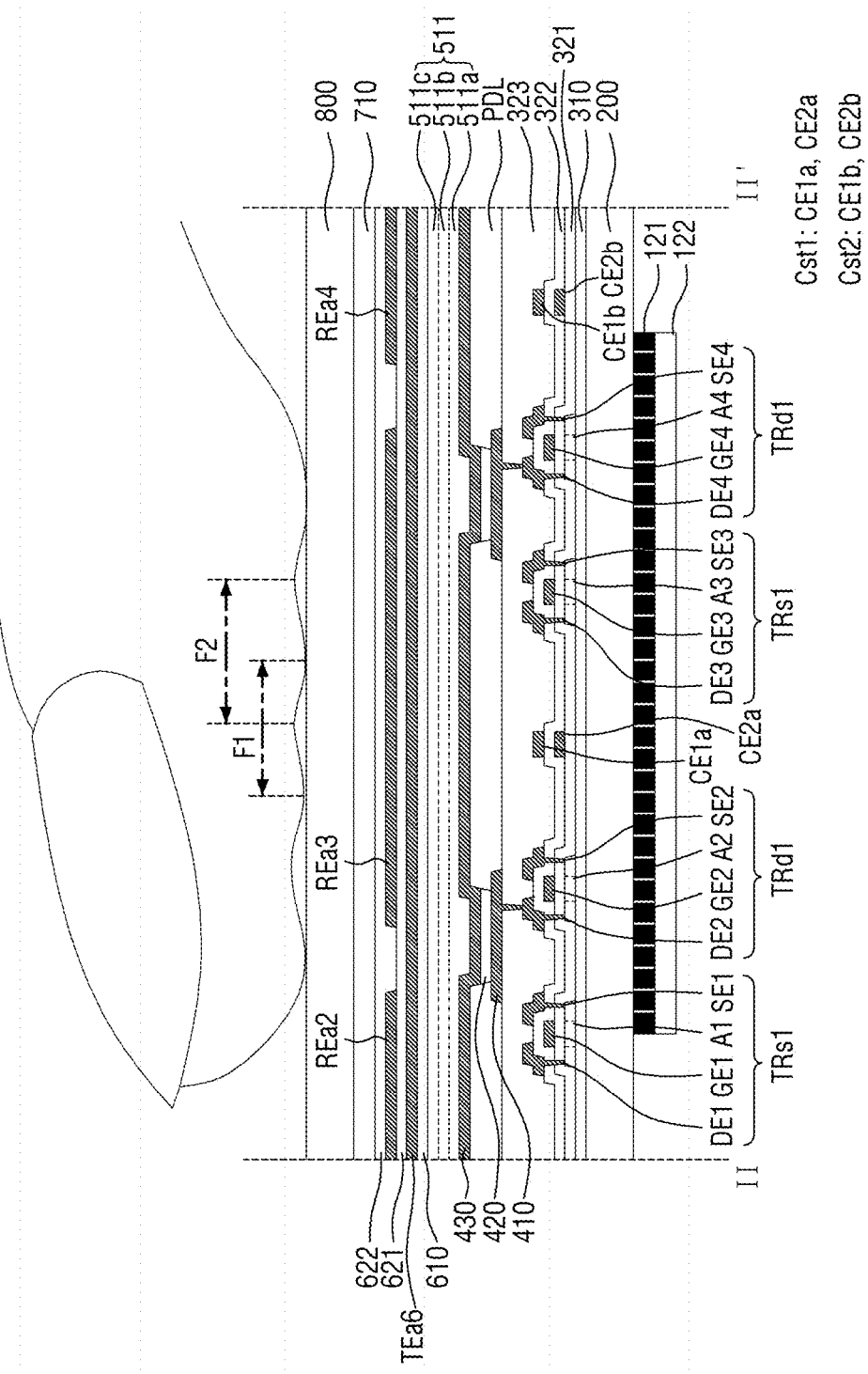
FIG. 21 is a cross-sectional view taken along a sectional line II-IF of FIG. 20.

FIG. 17 is a block diagram of an OLED display device according to another exemplary embodiment of the present disclosure. FIG. 18 is an equivalent circuit diagram of a pixel of the OLED display device of FIG. 17. FIG. 19 is a cross-sectional view illustrating the stack structure of the OLED display device of FIG. 17. FIG. 20 is a layout view of an input sensing layer illustrated in FIG. 19. FIG. 21 is a cross-sectional view taken along a sectional line II-IF of FIG. 20.

Referring to FIGS. 17, 18, 19, 20, and 21, an OLED display device 3 differs from the OLED display device 1 of FIGS. 3, 4, 13, and 14 in that a fingerprint sensor 100 uses an optical sensing method, that each pixel includes seven transistors, and that the fingerprint sensor 100 is disposed on the bottom of a base substrate 200, instead of incorporating a fingerprint sensing unit into an input sensing layer 600_1.

A fingerprint sensor (121 and 122) may be an optical fingerprint sensor capable of recognizing a fingerprint by sensing light emitted by OLEDs and reflected from the ridges and valleys of the fingerprint, with the use of an image sensor 122. In one exemplary embodiment, the fingerprint sensor (121 and 122) may include a pin hole mask 121, which transmits light reflected by a fingerprint therethrough, and the image sensor 122, which generates an electrical signal by sensing the light transmitted through the pin hole mask 121. The pin hole mask 121 may be formed of an opaque material so as to transmit light through pin holes thereof and to block the transmission of light in areas where the pin holes are not formed. The pin hole mask 121 may be formed of a material with low reflectance.

The fingerprint sensor (121 and 122) may be implemented as a semiconductor chip or a semiconductor package and may be attached to the bottom of the base substrate 200. In one exemplary embodiment, the image sensor 122 may be implemented as a semiconductor layer or a semiconductor chip in which multiple photoelectric conversion elements (e.g., photodiodes, phototransistors, photogates, or pinned photodiodes) are formed. The image sensor 122 may be a semiconductor layer in which an image sensor such as a complementary metal-oxide-semiconductor (CMOS) image sensor (CIS) or a charge-coupled device (CCD) is formed. In the description that follows, it is assumed that the photoelectric conversion elements of the image sensor 122 are, but not limited to, photodiodes.

The image sensor 122 includes a plurality of sensor pixels, and the sensor pixels sense light reflected from different parts of a fingerprint and generate electrical signals corresponding to the sensed light. The sensor pixels may generate electrical signals corresponding to light reflected from the ridges of a fingerprint or light reflected from the valleys of a fingerprint. The amount of light sensed by the photodiodes of the image sensor 122 may vary depending on the shape of a fingerprint, and electrical signals having different levels may be generated depending on the amount of light sensed by the photodiodes of the image sensor 122. That is, each of the electrical signals generated by the sensor pixels may include brightness information (or image information), and by processing the electrical signals, a determination may be made as to whether parts of a fingerprint that correspond to the sensor pixels are ridges or valleys. Then, a fingerprint image may be configured by combining the results of the determination.

Parts of a fingerprint that are optically sampled by the fingerprint sensor (121 and 122) may be defined as a plurality of fingerprint pixels. For example, the plurality of fingerprint pixels corresponding to the sensor pixels of the image sensor 122 may be defined, and each of the fingerprint pixels may correspond to a single pin hole and a subject area shown by a single sensor pixel. The shape and the size of the fingerprint pixels may be determined based on various factors such as the distance between the display panel 13 and the pin hole mask 121, the distance between the pin hole mask 121 and the image sensor 122, the thickness of the pin hole mask 121, and the diameter and the shape of the pin holes of the pin hole mask 121.

Each of the fingerprint pixels may correspond to a single pin hole of the pin hole mask 121. Each of the fingerprint pixels may include a region that reflects light transmitted through a single pin hole, and this region may be defined as an optical sampling region. An optical sensing region may also be defined in the image sensor 122 to correspond to the optical sensing region of the fingerprint pixels. For example, the optical sensing region of the image sensor 122 may include the sensor pixels of the image sensor 122.

The pin holes of the pin hole mask 121 may correspond to the sensor pixels of the image sensor 122. For example, a single sensor pixel corresponding to a single pin hole may include a single photodiode. In another example, a single sensor pixel corresponding to a single pin hole may include two or more photodiodes. FIG. 1 illustrates an example in which a single sensor pixel includes multiple photodiodes. That is, multiple pin holes may be formed in the pin hole mask 121 to be mapped to multiple pixels of the image sensor 122, light reflected from the fingerprint pixels in the optical sampling region is sensed by one or more photodiodes in each of the sensor pixels, and an entire fingerprint image may be reconfigured by processing electrical signals from multiple sensor pixels.

Regions may be defined in the image sensor 122 to correspond to the fingerprint pixels, and each of the defined regions may include multiple photodiodes. Each of the sensor pixels may correspond to a region including at least some of the multiple photodiodes corresponding to a respective fingerprint pixel. That is, a single sensor pixel is required to sense light corresponding to its respective single fingerprint pixel and needs to be prevented or reduced from being overlapped by light corresponding to another fingerprint pixel.

In response to light emitted from a plurality of pixels being reflected by a fingerprint, the OLED display device 3 may acquire fingerprint information in an optical sensing manner. The precision of optical information acquired by the fingerprint sensor (121 and 122) and the speed of acquiring such optical information may vary depending on the circuit structure of the plurality of pixels. The structure of each pixel of the OLED display device 3 and the driving method of the OLED display device 3 will hereinafter be described.

The OLED display device 3 includes a display 40, which includes a plurality of pixels, a scan driver 32, a data driver 33, an emission control driver 34, and a controller 50.

The display 40 includes a plurality of pixels, which are arranged at the intersections between a plurality of scan lines (SL11 through SL1n, SL21 through SL2n, and SL31 through SL3n), a plurality of data lines DL1 through DLm, and a plurality of emission control lines EL1 through ELn and are arranged in a matrix form.

The scan lines (SL11 through SL1n, SL21 through SL2n, and SL31 through SL3n) and the emission control lines EL1 through ELn may extend in a first direction dr1 (or a horizontal direction), and the data lines DL1 through DLm may extend in a second direction dr2.

An initialization voltage supply line for supplying an initialization voltage VINT may branch off into rows and may extend in the first direction dr1, and a first power supply voltage supply line for supplying a first power supply voltage ELVDD may branch off into columns and may extend in the second direction dr2. However, the present disclosure is not limited to this. That is, the directions in which the initialization voltage supply line and the first power supply voltage supply line extend may vary.

Three scan lines, one data line, one emission control line, one initialization voltage supply line, and one first power supply voltage supply line may be configured to pass through each pixel. The driving method of the OLED display device 3 will hereinafter be described, taking a pixel PX1_1 in a first row and a first column as an example.

The scan driver 32 generates three scan signals, i.e., first, second, and third scan signals Gw-p, Gw-n, and GI, and transmits the first, second, and third scan signals Gw-p, Gw-n, and GI to the pixel PX1_1 via three scan lines, i.e., first, second, and third scan lines SL11, SL21, and SL31.

The emission control driver 34 generates an emission control signal EM and transmits the emission control signal EM to the pixel PX1_1 via the emission line EL1. The emission control signal EM controls the emission duration of the pixel PX1_1. The emission control driver 34 may be optional.

The first power supply voltage ELVDD, a second power supply voltage ELVSS, and the initialization voltage VINT may be provided by an external voltage source.

The pixel PX1_1 includes an OLED "OLED", a plurality of transistors (TR1 through TR7), and a storage capacitor Cst.

A data signal dl, the first scan signal Gw-p, the second scan signal Gw-n, the third scan signal GI, the emission control signal EM, the first power supply voltage ELVDD, the second power supply voltage ELVSS, and the initialization voltage VINT are applied to the pixel PX1_1.

The transistors (TR1 through TR7) include first through seventh transistors TR1 through TR7. Each of the first through seventh transistors TR1 through TR7 may be a P-type metal-oxide-semiconductor (PMOS) transistor or an N-type metal-oxide-semiconductor (NMOS) transistor. In one exemplary embodiment, the first transistor TR1, which is a driving transistor, the second transistor TR2, which is a data transfer transistor, the fifth transistor TR5, which is a first emission control transistor, and the sixth transistor TR6, which is a second emission control transistor, may be PMOS transistors, and the third transistor TR3, which is a compensating transistor, the fourth transistor TR4, which is a first initializing transistor, and the seventh transistor TR7, which is a second initializing transistor, may be NMOS transistors. PMOS transistors and NMOS transistors have different characteristics. By forming the third, fourth, and seventh transistors TR3, TR4, and TR7 as NMOS transistors having relatively excellent turn-off characteristics, the leakage of a driving current Id during the emission period of the OLED "OLED" can be reduced.

That is, by employing a pixel configuration using seven transistors and by forming the third, fourth, and seventh transistors TR3, TR4, and TR7 as NMOS transistors having relatively excellent turn-off characteristics, the leakage of the driving current Id during the emission period of the OLED "OLED" for optical sensing can be reduced. In this case, the precision and speed of fingerprint recognition in the process of collecting fingerprint information can be improved.

Specifically, as the frame rate of the pixel PX1_1 increases, the sustain period of a voltage charged in the storage capacitor Cst decreases, and as a result, a reduction in luminance can be reduced. Instead, the precision of a fingerprint sensing signal may decrease because of the influence of signals provided to the pixel PX1_1.

On the other hand, as the frame rate of the pixel PX1_1 decreases, the sustain period of the voltage charged in the storage capacitor Cst increases, and as a result, the luminance of the pixel PX1_1 may gradually decrease due to a leakage current. Instead, the influence of signals provided to the pixel PX1_1 on a fingerprint sensing signal may also decrease. Since the third, fourth, and seventh transistors TR3, TR4, and TR7 are formed as NMOS transistors having relatively excellent turn-off characteristics, the leakage of the driving current Id during the emission period of the OLED "OLED" can be reduced. As a result, a reduction in luminance can be reduced, and the precision of a fingerprint sensing signal can be uniformly maintained.

The gate electrode of the first transistor TR1 is connected to the first capacitor electrode of the storage capacitor Cst. The first electrode of the first transistor TR1 is connected to a first power supply voltage terminal ELVDD via the fifth transistor TR5. The second electrode of the first transistor TR1 is connected to the first pixel electrode of the OLED "OLED" via the sixth transistor TR6. The first transistor TR1 receives the data signal dl in accordance with a switching operation of the second transistor TR2 and supplies the driving current Id to the OLED "OLED".

The gate electrode of the second transistor TR2 is connected to a first scan signal terminal Gw-p. The first electrode of the second transistor TR2 is connected to a data signal terminal dl. The second electrode of the second transistor TR2 is connected to the first electrode of the first transistor TR1 and is also connected to the first power supply voltage terminal ELVDD via the fifth transistor TR5. The second transistor TR2 is turned on by the first scan signal Gw-p and performs a switching operation to transmit the data signal dl to the first electrode of the first transistor TR1.

The gate electrode of the third transistor TR3 is connected to a second scan signal terminal Gw-n. The first electrode of the third transistor TR3 is connected to the second electrode of the first transistor TR1 and is also connected to the anode of the OLED "OLED" via the sixth transistor TR6. The second electrode of the third transistor TR3 is connected to the first capacitor electrode of the storage capacitor Cst, the first electrode of the fourth transistor TR4, and the gate electrode of the first transistor TR1. The third transistor TR3 is turned on by the second scan signal Gw-n and diode-connects the first transistor TR1 by connecting the gate electrode and the second electrode of the first transistor TR1. Accordingly, as much a voltage difference as the threshold voltage of the first transistor TR1 is generated between the first electrode and the gate electrode of the first transistor TR1, and any threshold voltage deviation in the first transistor TR1 can be compensated for by providing a threshold voltage-compensated data signal DATA to the gate electrode of the first transistor TR1.

The gate electrode of the fourth transistor TR4 is connected to a third scan signal terminal GI. The second electrode of the fourth transistor TR4 is connected to an initialization voltage terminal VINT. The first electrode of the fourth transistor TR4 is connected to the first capacitor electrode of the storage capacitor Cst, the second electrode of the third transistor TR3, and the gate electrode of the first transistor TR1. The fourth transistor TR4 is turned on by the third scan signal GI and transmits the initialization voltage VINT to the gate electrode of the first transistor TR1 to initialize the voltage at the gate electrode of the first transistor TR1.

The gate electrode of the fifth transistor TR5 is connected to an emission control signal terminal EM. The first electrode of the fifth transistor TR5 is connected to the first power supply voltage terminal ELVDD. The second electrode of the fifth transistor TR5 is connected to the first electrode of the first transistor TR1 and the second electrode of the second transistor TR2.

The gate electrode of the sixth transistor TR6 is connected to the emission control signal terminal EM. The first electrode of the sixth transistor TR6 is connected to the second electrode of the first transistor TR1 and the first electrode of the third transistor TR3. The second electrode of the sixth transistor TR6 is connected to the first pixel electrode of the OLED "OLED".

The fifth and sixth transistors TR5 and TR6 are turned on at the same time by the emission control signal EM, and as a result, the driving current ID flows to the OELD "OLED".

The gate electrode of the seventh transistor TR7 is connected to the emission control signal terminal EM. The first electrode of the seventh transistor TR7 is connected to the anode of the OLED "OLED". The second electrode of the seventh transistor TR7 is connected to the initialization voltage terminal VINT. The seventh transistor TR7 is turned on by the emission control signal EM and initializes the anode of the OLED "OLED".

The seventh transistor TR7 receives the same emission control signal EM as the fifth and sixth transistors TR5 and TR6, but may be turned on at a different timing from the fifth and sixth transistors TR5 and TR6 because the seventh transistor TR7 is an NMOS transistor, whereas the fifth and sixth transistors TR5 and TR6 are PMOS transistors. That is, when the emission control signal EM has a high level, the seventh transistor TR7 is turned on, and the fifth and sixth transistors TR5 and TR6 are turned off. When the emission control signal EM has a low level, the seventh transistor TR7 is turned off, and the fifth and sixth transistors TR5 and TR6 are turned on. Thus, during an emission period when the fifth and sixth transistors TR5 and TR6 are turned on, the initialization operation of the seventh transistor TR7 may not be performed, and during a non-emission period when the fifth and sixth transistors TR5 and TR6 are turned off, the initialization operation of the seventh transistor TR7 may be performed.

The second capacitor electrode of the storage capacitor Cst is connected to the first power supply voltage terminal ELVDD. The first storage electrode (CE1a or CE1b) of the storage capacitor Cst is connected to the gate electrode of the first transistor TR1, the second electrode of the third transistor TR3, and the first electrode of the fourth transistor TR4. The second pixel electrode of the OLED "OLED" is connected to the second power supply voltage terminal ELVSS. The OLED "OLED" receives the driving current Id from the first transistor TR1 and emits light, thereby displaying an image.

A fingerprint management method of the OLED display device 3, which includes a fingerprint sensing unit using optical sensing, like the fingerprint management methods according to the previous exemplary embodiments of the present disclosure, may include the steps of: detecting a request for fingerprint authentication (SS1); displaying a fingerprint authentication area (SS2); determining the presence of touch input from the user (SS3); changing a fingerprint authentication display state and collecting and processing fingerprint information (SS4); and determining whether an input fingerprint has been successfully authenticated by determining whether the input fingerprint matches registered fingerprint information (SS5).

In one exemplary embodiment, when the fingerprint authentication area is activated, the driving state of pixels overlapping with the fingerprint authentication area may change. In steps that require fingerprint recognition, the pixels overlapping with the fingerprint authentication area may be driven at a first frequency FR1, and in steps that do not require fingerprint recognition, the pixels overlapping with the fingerprint authentication area may be driven at a second frequency FR2, which is lower than the first frequency FR1. For example, if a first function state is maintained before the activation of the fingerprint authentication area, pixels in a display area DA may be driven at the first frequency FR1. Then, once the fingerprint authentication area is activated, the pixels overlapping with the fingerprint authentication area may be driven at the second frequency FR2. By providing scan signals having the second frequency FR2, which is relatively low, to the pixels overlapping with a fingerprint sensing area FA during a period when fingerprint authentication is actually performed, noise that may be caused by optical signals input to the fingerprint sensing unit can be reduced. Accordingly, the SNR of a fingerprint sensing signal can be improved.

The OLED display device 3 employs a pixel configuration that can reduce the driving current Id. Thus, when the fingerprint authentication area is activated, fingerprint sensing can be performed with precision, even if the pixels overlapping with the fingerprint authentication area are driven at the second frequency FR2.

According to the aforementioned and other exemplary embodiments of the present disclosure, SNR can be improved in connection with fingerprint sensing through variable frequency driving.

The effects of the present invention are not limited by the foregoing, and other various effects are anticipated herein.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A fingerprint management method of a display device comprising a first area in which a fingerprint is recognized and a second area in which a fingerprint is not recognized, the fingerprint management method comprising:
   first set of steps during which fingerprint recognition is not performed; and
   second set of steps during which the fingerprint recognition is performed,
   wherein the display device comprises a plurality of pixels comprising a first pixel set disposed to overlap with the first area, and a second pixel set disposed to overlap with the second area and includes a plurality of pixels, and
   wherein the method comprises providing a first voltage signal to the first pixel set and the second pixel set, the first voltage signal being a variable frequency signal comprising:
   a first frequency signal in the first set of steps; and
   a second frequency signal having a lower frequency than the first frequency signal, in the second set of steps.

2. The fingerprint management method of claim 1, wherein the first set of steps comprises detecting a request for fingerprint authentication, and
   wherein the second set of steps comprises:
      determining a presence of a fingerprint touch input; and
   collecting and processing fingerprint information.

3. The fingerprint management method of claim 1, wherein the first frequency signal has a frequency of 60 Hz or greater and 120 Hz or less, and
   wherein the second frequency signal has a frequency of 0.1 Hz or greater and 20 Hz or less.

4. The fingerprint management method of claim 1, wherein in the first set of steps, a frequency signal having a frequency of substantially 0 Hz is provided to the first pixel set.

5. The fingerprint management method of claim 1, wherein in the first set of steps, the first frequency signal is provided to the first pixel set to emit light, and
   wherein in the second set of steps, the second frequency signal is provided to the first pixel set to emit light.

6. The fingerprint management method of claim 5, wherein in the second set of steps, the second pixel set does not emit light.

7. The fingerprint management method of claim 1, wherein the display device has a display area, and a non-display area disposed on the outside of the display area, and
   wherein the display area comprises the first area and the second area.

8. A fingerprint management method of a display device comprising a first area in which a fingerprint is recognized and a second area in which a fingerprint is not recognized, the fingerprint management method comprising:
- first set of steps during which fingerprint recognition is not performed; and
- second set of steps during which the fingerprint recognition is performed,
- wherein the display device comprises a plurality of pixels comprising a first pixel set disposed to overlap with the first area, and a second pixel set disposed to overlap with the second area and includes a plurality of pixels, and
- wherein each of the plurality of pixels connected to a scan line and a data line, and a data voltage of the data line is supplied to each of the plurality of pixels according to a scan signal of the scan line, and
- wherein the method comprises providing a first scan signal the first pixel set, the first voltage signal being a variable frequency signal comprising:
- the first scan signal having a first frequency in the first set of steps; and
- the first scan signal having a second frequency lower than the first frequency, in the second set of steps.

* * * * *